United States Patent [19]
Geiger et al.

[11] Patent Number: 6,073,142
[45] Date of Patent: Jun. 6, 2000

[54] AUTOMATED POST OFFICE BASED RULE ANALYSIS OF E-MAIL MESSAGES AND OTHER DATA OBJECTS FOR CONTROLLED DISTRIBUTION IN NETWORK ENVIRONMENTS

[75] Inventors: Fred J. Geiger, Park City; William K. Wood, West Weber; Sonjaya T. Tandon, Park City, all of Utah

[73] Assignee: Park City Group, Park City, Utah

[21] Appl. No.: 08/881,034

[22] Filed: Jun. 23, 1997

[51] Int. Cl.[7] ............................................. G06F 7/00
[52] U.S. Cl. ............................................. 707/500; 709/204
[58] Field of Search ............................... 707/500; 709/204, 709/205, 206

[56] References Cited

U.S. PATENT DOCUMENTS

| | | | |
|---|---|---|---|
| 4,106,060 | 8/1978 | Chapman, Jr. | 358/402 |
| 5,204,939 | 4/1993 | Yamazaki et al. | 706/50 |
| 5,283,856 | 2/1994 | Gross et al. | 395/51 |
| 5,555,346 | 9/1996 | Gross et al. | 706/45 |
| 5,619,648 | 4/1997 | Canale et al. | 395/200.01 |
| 5,632,011 | 5/1997 | Landfield et al. | 395/326 |
| 5,675,733 | 10/1997 | Williams | 395/200.01 |
| 5,768,505 | 6/1998 | Gilchrist et al. | 395/200.31 |
| 5,796,394 | 8/1998 | Wicks et al. | 345/329 |

OTHER PUBLICATIONS

Amadi, A. O., "Automatic Filing and Retrievel of Offical Messages Using Global Mail Attributes and a Viewdata System with Symbollically Named Pages," Office Information Systems, pp. 11–18, Oct. 1988.

Ayre, R., "Evolving E–Mail: Will Client/Server Get the Message?," PC Magazine, vol. 10, No. 15, pp. 322–323, Sep. 10, 1991.

Berlind, D., "Don't Allow Rules of E–Mail to Get Broken," PC Week, vol. 12, No. 3, p. 55, Jan. 23, 1995.

Buyers Guide, "Choosing An E–Mail Package," PC User, No. 264, p. 31, Jul. 26, 1995.

Kramer, M., "Mail Scout Motto: Filter E–Mail," PC Week, vol. 12, No. 23, p. 65, Jun. 12, 1995.

(List continued on next page.)

*Primary Examiner*—Stephen S. Hong
*Assistant Examiner*—Cesar B. Paula
*Attorney, Agent, or Firm*—Fenwick & West LLP

[57] ABSTRACT

A system, method and various software products provide for automatic deferral and review of e-mail messages and other data objects in a networked computer system, by applying business rules to the messages as they are processed by post offices. The system includes rule enforcing post offices that store a plurality of business rules derived from business communication policies. The rule enforcing post offices receive messages from client applications and from other post offices and apply the business rules with a rule engine. The rule engine determines a set of actions, specified by business rules that are fired, to be applied to each message. The rule engine provides the actions to a distribution engine, which executes a highest priority action. Actions include releasing, deleting, returning, forwarding, or gating the message. Gating forwards the message to a gatekeeper, an administrator assigned to review messages for conformity with business policies or for other reasons. The gated messages are received by the gatekeeper at a gatekeeping post office. A gatekeeper can review the gated messages, and then manually release, delete, return, or further gate the message. Alternatively, if the gatekeeper does not review a gated message with a specified time period, the message is automatically reviewed by the gatekeeping post office with its own set of business rules. Having multiple post offices with independent sets of business rules allows for distributed and hierarchical review and gating of the messages. The system can route any type of data object, and apply the business rules to such objects in a similar manner.

26 Claims, 23 Drawing Sheets

OTHER PUBLICATIONS

Marshak, D. S., "Separating the Wheat from the Chaff," Patricia Seybold's Office Computing Report, vol. 13, No. 11, pp. 1–16, Nov. 1990.

Pollock, S., "A Rule–Based Message Filtering System," ACM Transactions on Office Information Systems, vol. 6, No. 3, pp. 232–254, Jul. 1988.

Rizzo, J., "Macs to Achieve cc:Mail Parity," MacUser, vol. 11, No. 9, p. 109, Sep. 1995.

Rosenberg, J., Everhart, C. F., and Borenstein, N. S., "An Overview of the Andrew Message System," Information Technology Center, Carnegie Mellon University, pp. 99–108, Jul. 1987.

Turner, L., "Rules for Messaging," Network World, p. 65, Mar. 20, 1995.

Willis, D., "Messaging Stand–Off—Lotus Notes 4.1 Battles Microsoft Exchange Server In A Clash Of Messaging Titans," Network Computing, p. 50, Jun. 15, 1996.

CONFIGURING A RULE ENFORCING POST OFFICE

```
                                                   ┌─ 800
┌──────────────────────────────────────────────────────┐
│ ActionManager   Action Gatekeeper Admin [gkadmin]    Mon Sep 02 1996 03:32:36PM │
│ ┌─┐─────────────────── Edit Checkpoint Rule ──────────────────│
│ └─┘                                                  │
│        Rule Description: │Size Rule            │ ─ 802│
│   IF                                                 │
│ ─────────────────────────────────────────────────────│
│   Property        Attribute         Operator      Value │
│  │Message │+│ │Size [in Kb]│+│ │Greater │+│ │100    │ │
│     ╲                ╲                 ╲            ╲ │
│      804             803      OR       806          808│
│                                                      │
│  │Attachments│+│ │Attachment Size [total]│+│ │Greater│+│ │100│ │
│              ┌─────┐ ┌──────────────┐ ┌────┐         │
│              │ AMD │ │NO CONJUNCTION│ │ OR │         │
│              └─────┘ └──────────────┘ └────┘         │
│   THEN                    ‿‿‿                        │
│                           810                        │
│ ─────────────────────────────────────────────────────│
│    Do Action: │Forward To Gatekeeper     │+│─ 812    │
│      Reason:  │Msg/Attachments too large.│ ─ 814  ┌─ 816│
│ ┌─ To Gatekeeper Address: ──────────────────────── │
│ │ Post Office: │DISTD        │   Role: │Gatekeeper 1│ │
│ └──────────────────────────────────────────────────┘ │
│ ┌─────────┐                                          │
│ │F10 Save │                                          │
│ └─────────┘                                          │
└──────────────────────────────────────────────────────┘
```

FIG. 8

RULE ENFORCING POST OFFICE

RULE ENGINE

EVALUATOR FLOW

DISTRIBUTION ENGINE FLOW

CONFIGURING A GATEKEEPING POST OFFICE

GATEKEEPING RECEIPT ENGINE

GATEKEEPING INTERFACE CLIENT FLOW

AUTOMATED POST OFFICE BASED RULE ANALYSIS OF E-MAIL MESSAGES AND OTHER DATA OBJECTS FOR CONTROLLED DISTRIBUTION IN NETWORK ENVIRONMENTS

FIELD OF THE INVENTION

The present invention relates generally to electronic messaging systems, and more particularly to electronic messaging systems that enable the application of business communication policies for controlling distribution of electronic messages and other data objects.

BACKGROUND OF THE INVENTION

Many corporate organizations have elaborate methods to control the flow of memorandum, publications, notices, and other printed information within the organization. An organization may limit the types of documents employees can distribute at work, and in some cases, control which persons within an organization communicate with each other. For example, the organization may prohibit the distribution of memoranda to all employees in order to reduce photocopying costs; it may except this rule for individuals with specific corporate positions, such as the president or chairman. As another example, an organization may filter documents that are to be sent to specific persons or departments, or it may automatically copy (archive) documents distributed by certain persons or departments. Finally, organizations ordinarily have rules that prohibit distribution of certain types of documents, such as those containing disparaging, sexist, or profane materials. These various rules are typically documented as part of the organization's business communication policies, and managed by the personnel, human resources, or other departments.

Most organizations today also use electronic messaging systems, or e-mail, for inter- and intra-company communications. Generally, an e-mail system comprises one or more post offices, zero or more mail servers and a relatively large number of e-mail client applications. The post offices are distribution mechanisms which receive e-mail messages from client applications (both within the organization and external thereto) and transfer these e-mail messages to other post offices associated with the specified recipients, who again are both within and external to the organization or system. Conventional post offices operate on a store and forward model, where an e-mail message is stored only temporarily for the duration it takes to route the message to the next post office(s).

In e-mail systems which use mail servers, post offices deliver incoming messages to a mail server which persistently stores the messages for the recipients. The recipients access the messages via the client applications. In some systems where mail servers are not used, the post offices deliver e-mail messages directly to the client applications. The e-mail client applications are end-user applications for creating, reading, and managing a user's individual e-mail account.

The fundamental operating paradigm of conventional post offices and mail servers is unabated delivery, which is intended to deliver an e-mail message from its sender to its recipients as directly as possible, with no interference from other users or administrators. Thus, a conventional post office receives and routes a message as quickly as possible, and does not purposely delay routing in order to process or otherwise delay the message. Existing e-mail protocols, such as Simple Mail Transfer Protocol (Internet RFC 821), all are intended to operate by unabated delivery.

With the increasing reliance on e-mail for all types of corporate communications, it is becoming increasingly desirable for an organization to be able to define and automatically enforce communication policies with respect to the handling of e-mail messages in their e-mail systems. An organization should be able to define specific business rules which implement its business communication policies, and apply these business rules to all e-mail messages on the e-mail system in order to monitor and control the distribution and handling of e-mail messages. In particular, it is desirable to provide such business rules within a post office, so that the business rules may be applied to all e-mail messages handled by the post office, regardless of their origin or destination.

Conventionally, however, organizations have not had the ability to define and automatically enforce communication policies with respect to the handling of e-mail messages by post offices. This is because conventional post offices are designed to implement existing e-mail protocols, which are based on unabated delivery. As a result these post offices are not designed to apply business rules to e-mail messages which either intentionally delay or prohibit delivery of e-mail messages. Delayed, intercepted, or prohibited delivery is antithetical to the unabated delivery concept, and thus, conventional post offices do not provide this ability. Similarly, conventional mail servers, which normally only serve messages to client applications, do not process or otherwise delay message delivery in order to apply business rules thereto.

At best, most available e-mail systems do allow the individual user of the e-mail client application to define how e-mail messages received or sent by that specific e-mail client application are to be handled. For example, the user of an e-mail client application may decide to store e-mail messages received from particular senders in various mailbags or directories. However, conventional e-mail systems do not enable the organization to define specific business communication policy based rules for the post office itself to use in order to control the delivery of e-mail messages. Since all e-mail messages are received and routed by a post office, it is desirable to provide such ability directly at the post office rather than at the individual client application, which would at best provide only limited, and inconsistent rule application.

It should be noted that from a technical standpoint, conventional post offices do employ routing rules for routing and addressing e-mail messages. These rules however, are merely physical, data, or transport layer protocol rules (layers 2, 3, 4 of the OSI model), and describe only the low level handling of the e-mail message. Control of the delivery of e-mail messages by the post office itself is at the application or session layer (layer 7, 6). Thus, existing low level filtering rules do not provide the desirable ability to define business rules which implement business communication policies for handling e-mail messages.

E-mail messages are but one type of data object which are communicated over networks. In addition to the use of e-mail systems, organizations use their internal and external networks to distribute and route many other types of data objects, such as database records, forms, application programs, and so forth. However, there as yet appears no mechanism by which an organization can control the distribution of such data objects in light of business communication policies. Accordingly, it is desirable to provide a generalized data server that includes the ability to define business rules for handling the distribution of various types of data objects.

SUMMARY OF THE INVENTION

The present invention overcomes the deficiencies of conventional systems and provides the beneficial ability to define business rules that implement business communication policies for controlling the handling of e-mail messages and other data objects by a data server. In the present invention, a data server is an e-mail type post office that includes the ability to directly distribute any general form of data in addition to e-mail messages. The present invention enables the data server to monitor e-mail messages and other data objects, and to selectively gate, delete, forward, copy, release, or return e-mail messages and other data objects by applying the business rules to the messages and data received at the post office for delivery to others. Gating messages re-route the e-mail message from its specified recipients to a gatekeeper at a gatekeeping post office. Here, the gated message is additionally reviewed (either manually or automatically) and further processed, which again may include any of the above actions.

In accordance with one embodiment of the present invention for distribution of email and related data formats, a post office includes a receipt engine, a database of business rules, a rule engine, and a distribution engine. The receipt engine provides support for conventional e-mail protocols, such as SMTP or POP, so as to be able to receive e-mail messages from both internal client e-mail applications, and external e-mail systems.

The database of business rules are used to implement business communication polices of the organization. Each business rule describes a particular action to be applied to an e-mail message in response to either attributes of the e-mail message or performance data of the post office. For example, a business rule may specify actions such as deleting the e-mail message, gating the e-mail message for further review, copying the e-mail message, returning the e-mail message to its sender without delivering it, forwarding the e-mail message to a new recipient, or releasing an e-mail message to its specified recipients. The attributes of an e-mail message which may trigger application of a business rule include, for example, the size of the e-mail message, the number of attachments, the size of individual or all attachments, the text of the message or its subject line, the inclusion of specific addresses or distribution lists, and other message-specific attributes. For example, a business rule to gate an e-mail for further review may be triggered for any e-mail message that is addressed to the president of the company. As another example, a business rule that returns an e-mail message to its sender may be triggered when the e-mail message or its attachments exceed a certain size, or that are addressed to a particular distribution list, such as "All Employees."

Business rules may also be used at the post office to direct incoming e-mails to particular employees for further handling. For example, a business rule may forward an e-mail message from outside of the company to a particular employee or user (e.g., Marketing Director) when the text of message matches specific keywords or other properties (e.g., text within the message matching product name keywords), even where the employee is not one of the originally specified recipients.

These various types of business rules enable the organization to apply very detailed, automatic control over all e-mail messages being handled by one or more post offices in the company's e-mail system.

Alternatively, a business rule may be triggered by conditions completely external to any particular e-mail message being handled, but rather in response to statistical performance factors for the post office. For example, a business rule to defer delivery of an e-mail message may be triggered when the average throughput of the post office exceeds a defined threshold. Thus, the business rules may be responsive to any discrete factors that reflect the business communication policies of the organization.

In accordance with the present invention, the rule engine operates with the database to apply the business rules to each e-mail message, in order to determine a set of actions (one or more) to be applied to the e-mail message.

In accordance with another aspect of the present invention, there are defined "bypass roles" that enable an e-mail message to be released (delivered) without further rule application by the rule engine. Bypass roles are associated with specific corporate positions, rather than specific persons (or e-mail addresses). For example, the corporate position of President may be a bypass role, such that all e-mail messages from the President are released without further application of the business rules.

The rule engine provides for each e-mail message it processes a set of actions to the distribution engine. The distribution engine is responsible for handling the e-mail message according to the set of actions. These actions may instruct the distribution engine to release the e-mail message, gate the e-mail message by delivering it to a specified gatekeeping post office, delete the e-mail message without delivering it, return the e-mail message to the sender, and so forth, as described above. In one embodiment, each action has a predefined priority level. The distribution engine then reviews the set of actions and applies the action having the highest priority level. For example, assume that as the result of different business rules being applied by the rule engine, the set of actions includes both deleting the message and copying the message. Deleting an e-mail message may be defined as a higher priority action than copying the message. Accordingly, the distribution engine would delete the e-mail message, without copying it.

More particularly, the present invention provides the ability to gate e-mail messages by altering the delivery of the e-mail message from its specified recipients to a gatekeeping post office, where they are stored for further review and handling. These gated e-mail messages may be manually reviewed by a corporate administrator designated as a gatekeeper, and either released, returned to the sender, deleted, forwarded, or copied. The gated e-mail messages may also be automatically processed by an independent set of business rules, and again various different actions may be applied. Because each gatekeeping post office may act independently, it may further gate the e-mail message to yet another gatekeeping post office. This enables distributed, network gatekeeping and review of the e-mail messages by any number of corporate officials designated as gatekeepers.

BRIEF DESCRIPTION OF THE DRAWINGS

FIG. 8 is an illustration of a user interface for defining specific business rules.

DETAILED DESCRIPTION OF THE PREFERRED EMBODIMENTS

I. System and Operational Overview

Figure 1:
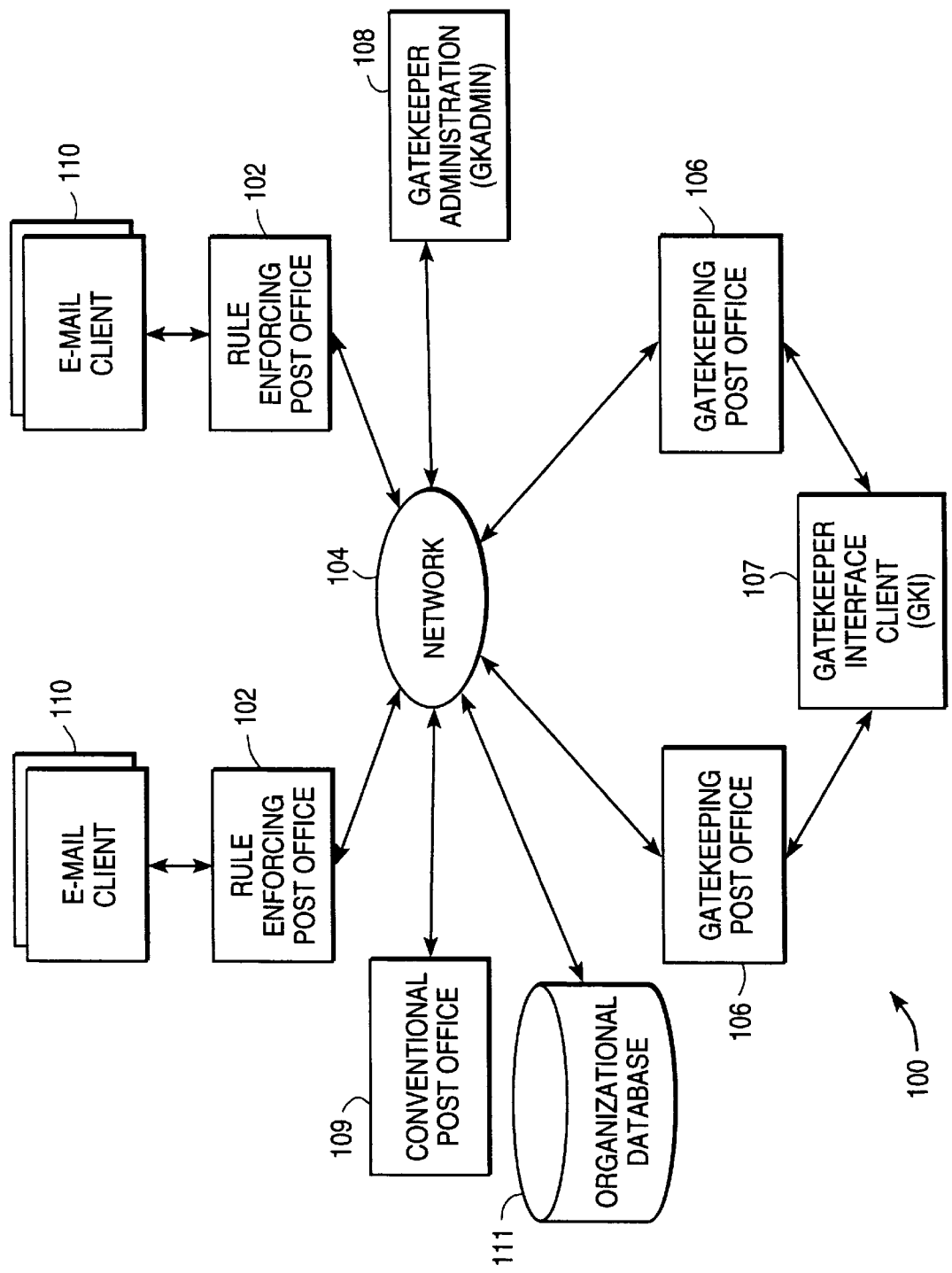
FIG. 1 is an illustration of a gatekeeping e-mail message system in accordance with the present invention.

Referring now to FIG. 1 there is shown one embodiment of a gatekeeping e-mail communication system of the present invention. An electronic communication system 100 operates on a conventional communications network 104, which may be a LAN, WAN, MAN, or the Internet.

Communicatively coupled to the network through conventional e-mail protocols, such as SMTP, POP3, and the like are one or more rule enforcing post offices 102 ("REPO 102") and one or more gatekeeping post offices 106 ("GPO 106"). In addition, a conventional post office 109 may be present to provide conventional mail transfer functionality for transferring e-mail messages to and from the REPOs 102, and GPOs 106. Additionally, conventional mail servers and conventional post office/mail server combinations may be present.

Communicatively coupled to REPOs 102 are conventional e-mail client applications 110. The e-mail client applications 110 are capable of generating and receiving e-mail messages in a conventional manner for individual users. Users may use the e-mail client applications 110 to address e-mail messages to other e-mail client applications 110 associated with any of the post offices 109, 102, 106. In this disclosure the terms "e-mail message" and "message" are used interchangeably and are intended to have the same meaning.

A gatekeeper administration program 108 ("GKADMIN 108") is used by system administrators to configure the various REPOs 102 and GPOs 106 of the system. A gatekeeper interface client 107 ("GKI 107") is used by individual gatekeepers to access and review gated messages. A gatekeeper is a human administrator assigned a gatekeeper role and having responsibility for reviewing gated messages.

An organizational database 111 stores organizational information, including an organizational hierarchy of organizational roles and the individuals assigned to such roles. This information is used by the REPOs 102 and GPOs 106 to apply various rules to messages based on the role of the sender or recipient.

II. Overview of a Rule Enforcing Post Office

A conventional post office acts as a mail transfer agent, and provides only for mail transfer based on a temporary store and forward model. A REPO 102 is a post office that, in addition to conventional functionality for transferring messages, enforces an organization's business communications policies by applying to each e-mail message received (either from local e-mail clients applications 110 or other remote post offices) business rules which define actions to be applied to an e-mail message according to various attributes of the message or the state of the REPO 102 itself.

Figure 2:
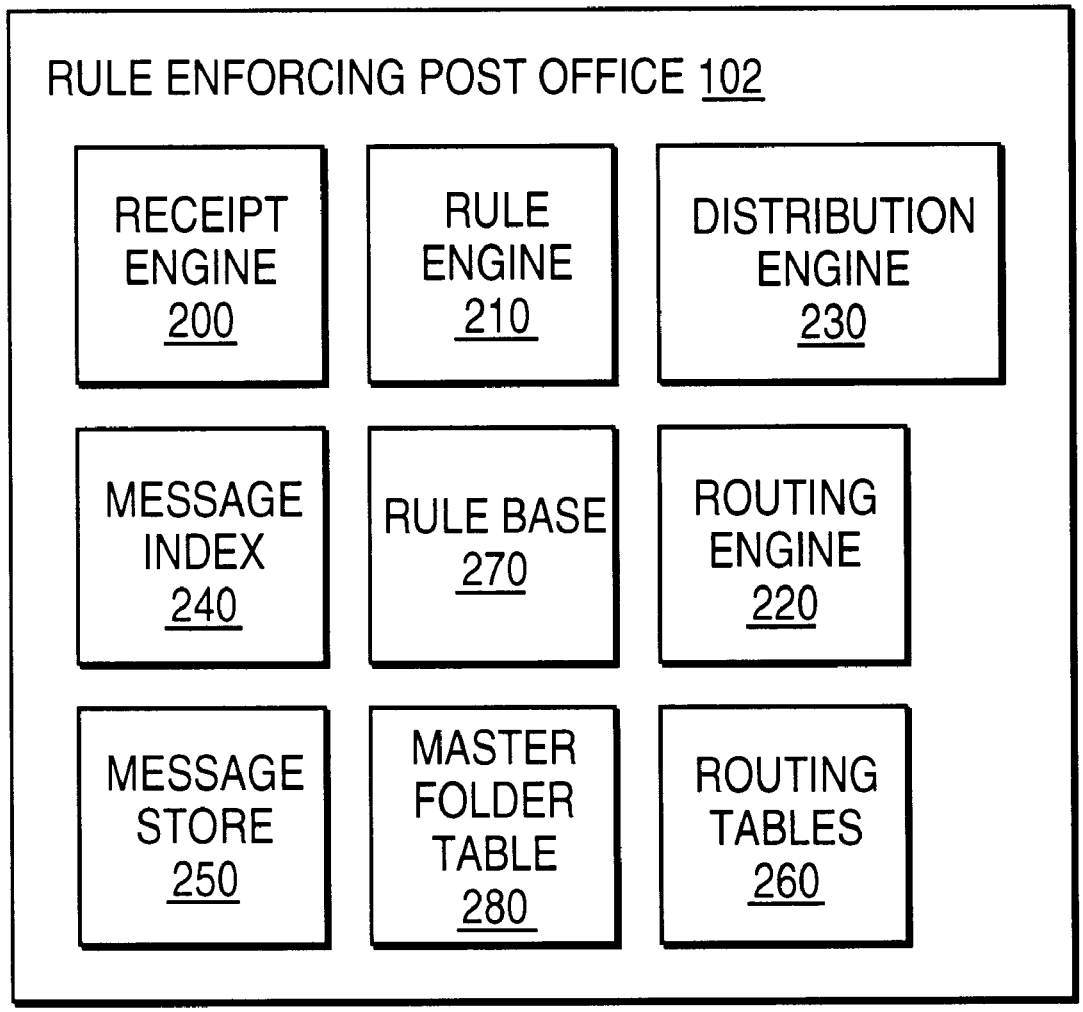
FIG. 2 is an illustration of the software architecture of a rule enforcing post office.

Referring now to FIG. 2, there is shown the software architecture of one embodiment of a REPO 102. A REPO 102 includes functional modules for receiving, processing, and distributing e-mail messages to and from e-mail client applications 110 and other post offices (including REPOs 102, GPOs 106, and conventional post offices 109). These functional modules are provided by a receipt engine 200, a rule engine 210, and a distribution engine 230, respectively. Supporting data storage includes a message index 240 and a message store 250. Also included are a routing engine 220 and routing tables 260.

The receipt engine 200 provides a standard communication protocol interface (e.g., SMTP, MHS) to other post offices in order to receive e-mail messages from such post offices, and from any e-mail client applications 110 directly associated with the REPO 102. The receipt engine 200 temporarily indexes and stores received messages in the message index 240 and message store 250 during processing of the message. The message store 250 generally provides for temporary storage of message objects for subsequent distribution by the distribution engine 230. The message index 240 provides interfaces to the rule engine 210 and the distribution engine 230 to enable these modules to retrieve e-mail messages from the message store 250, to enable the rule engine 210 to access stored messages for processing prior to any distribution.

The routing engine 220 cooperates with the routing tables 260 in a conventional manner to determine, given recipient or addressee information of an incoming message, the proper post office and mail protocols for further delivery of the message. The routing engine 220 provides the routing information to the distribution engine 230 when necessary to continue delivery of the message.

The rule engine 210 operates in conjunction with a rule base 270 to process incoming messages with business rules defined in the rule base 270. The rule base 270 stores one or more sets of business rules. Business rules are input into the rule base 270 using the GKADMIN 111. In this disclosure, "business rule" and "rule" are used interchangeably and are intended to have the same meaning. Each set of business rules is referred to as a "checkpoint," and a REPO 102 is alternatively known as a checkpoint post office. Each business rule specifies an action to be applied to a message by the distribution engine 230. The actions are output by the rule engine 210 in the form of an action list which is read and interpreted by the distribution engine 230.

Instead of operating under the conventional unabated delivery paradigm, the distribution engine 230 handles e-mail messages in accordance with actions specified for the messages in the action list. The distribution engine 230 supports conventional mail protocols for delivering messages to other post offices, both conventional and servers such as the REPO 102 and GPO 106. One of the significant actions of the distribution engine 230 is to "gate" an e-mail message by delivering it to one or more GPOs 106 instead of delivering it to any of the recipients specified by the sender. This gating action enables administrative review of the e-mail message by a gatekeeper administrator prior to any delivery.

A REPO 102 may also include a mail server component, so that client applications may communicate with the mail server to receive messages delivered to the REPO 102. In this embodiment, when the REPO 102 receives a message for a specified recipient associated with the post office, it transfers the message to an inbox for the mail server, which in turn makes the message available to the appropriate mail client application. In this embodiment, a master table folder 280 is optionally provided that defines, typically for each user associated with the REPO 102, a collection of folders (also called "mailbags" herein) for indexing stored messages. In this variation, the message store 250 is used for persistent storage of messages, enabling them to be served to client applications by the mail server.

III. Overview of a Gatekeeping Post Office

A GPO 106 is a post office that provides for administrative review and processing of gated messages. A GPO 106 provides for both manual review by a gatekeeper—a person designated to review gated messages—and automatic review and processing using its own set of business rules. Processing applies various actions to gated messages, including deleting the message without delivering it to the specified recipients, returning a message to its sender, copying a message prior to sending, editing a message, forwarding the message to a new recipient, and releasing a message for distribution to its specified recipients. A GPO 106 provides for both immediate execution of these processing actions or delayed execution. Thus, the primary function of the GPO 106 operates contrary to the conventional unabated delivery model by adding an additional processing and review layer between the sending of the message and its receipt (if ever) by the originally specified recipients.

There are two basic embodiments of a GPO 106. First, a GPO 106 may provide only gatekeeping functionality, as a post office which only receives gated messages, but otherwise is not used to rule process other messages as does a REPO 102. Second, a GPO 106 may also include the functionality of a REPO 102, and receive both gated messages and non-gated messages, and provide all of the rule processing functionality of a REPO 102 on such incoming non-gated messages. For the purposes of this disclosure, this integrated embodiment will be discussed first.

Figure 3:
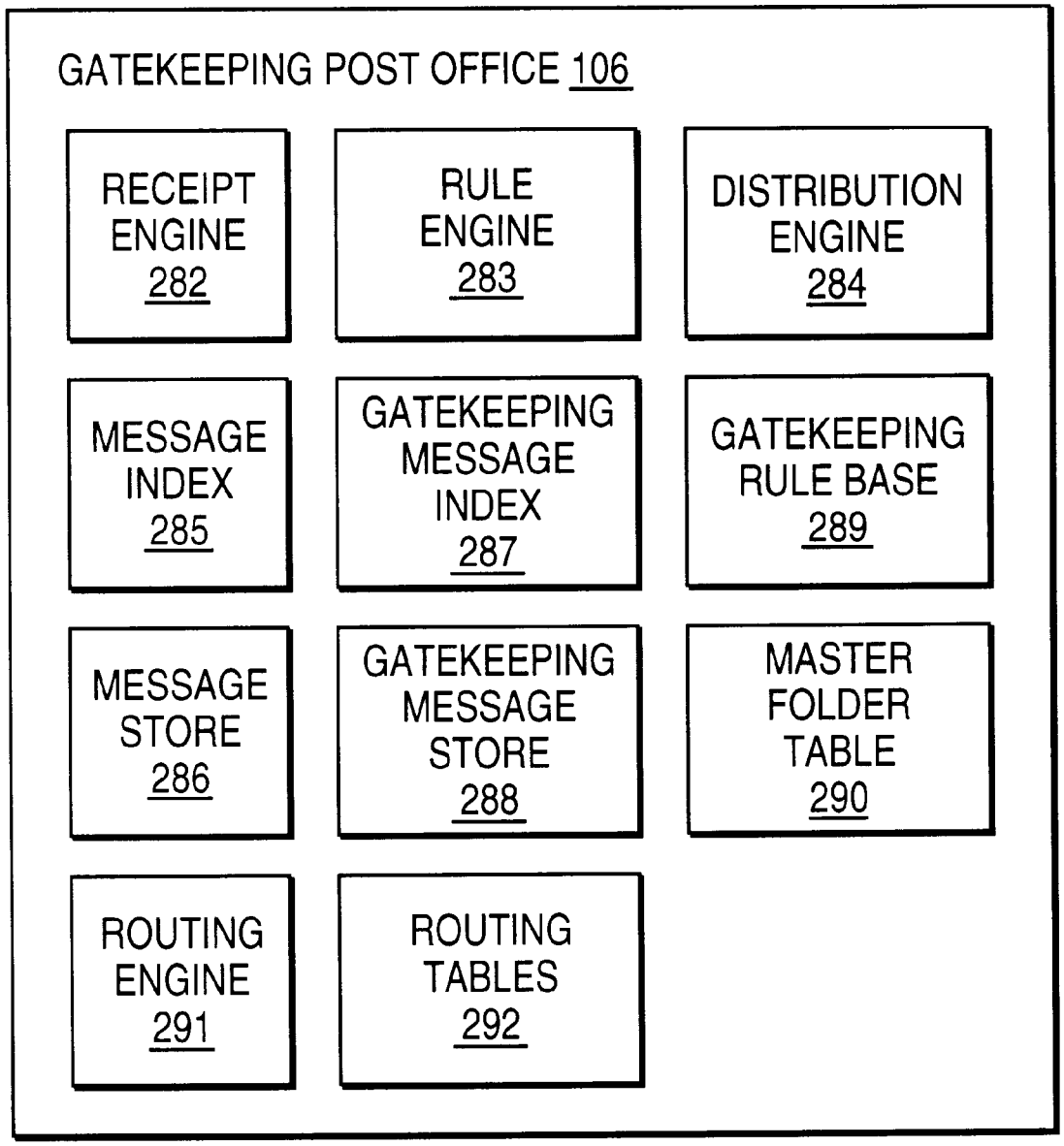
FIG. 3 is an illustration of the software architecture of a gatekeeping post office.

Referring now to FIG. 3, there is shown one embodiment of a GPO 106. Like a REPO 102, a GPO 106 includes a receipt engine 282, a rule engine 283, and a distribution engine 284. The GPO 106 extends the functionality of the receipt engine 282 and distribution engine 284 to handle messages which have been gated to the GPO 102, including providing functionality for automatically reviewing messages.

The receipt engine 282 operates in a manner similar to that described above to receive messages and to provide these messages to other components for indexing, storage, and processing. Because the GPO 106 receives gated messages from other post offices, the receipt engine 200 includes additional functionality for handling gated messages. This additional functionality includes distinguishing gated messages from non-gated messages as messages are being received, and providing gated messages to the inbox of a gatekeeper while providing non-gated messages to the receipt engine 282 for rule processing as described above. Further, the GPO 106 includes additional functionality, for example, as part of its program executive, to automatically review messages on a periodic basis and perform defined actions upon such messages.

The rule engine 210 operates in conjunction with a gatekeeping rule base 289, which stores a set of business rules for handling gated messages, and with a rule base 270 as described above for handling non-gated messages. The rules for the gatekeeping rule base 289 may be different from the rules applied at one of the REPOs 102 in the rule base 270 of the GPO 106, and in particular can be specifically adapted by the administrator with the intent of handling gated messages received from a REPO 102 or other GPOs 106.

To support the receipt and review of gated messages outside of the conventional delivery paradigm, a GPO 106 provides a gatekeeping message index 287 and gatekeeping message store 288 which is used to store gated messages prior to review and processing. The gatekeeping message index 287 and gatekeeping message store 288 are preferably separate from the message index 285 and message store 286 used for storing messages during normal rule processing and transfer. This is because during the gatekeeping phase storage is transient, typically for only as long as necessary to process the messages. In contrast, the gatekeeping message index 287 and gatekeeping message store 288 are used for persistent storage of gated messages until reviewed and processed, which may require storage for extended periods of time (e.g., 30 days).

FIG. 2 illustrates this embodiment with two distinct message indices and message stores. A regular message index 285 indexes all regular (non-gated) messages received by the GPO 106, which are then stored in the regular message store 286. Gated messages however are indexed in a gatekeeping message index 287, and stored in the gatekeeping message store 288. The GPO 106 distinguishes a gated message from a non-gated message by whether or not it is a wrapped message.

Messages in the gatekeeping message index 287 are categorized into a number of folders for subsequent handling. In this disclosure the term "mailbag" is used interchangeably with the term "folder." The master folder table 290 defines these folders and their parameters. The master folder table 290 includes an inbox for each gatekeeper, into which gated messages for that gatekeeper are placed. Useful folders which may be defined include a return folder, a delete folder, and a release folder; other folders may also be created as needed by a gatekeeper. Each folder has a unique folder ID which is stored with the message in the message index 240 and a folder name.

Figure 19:
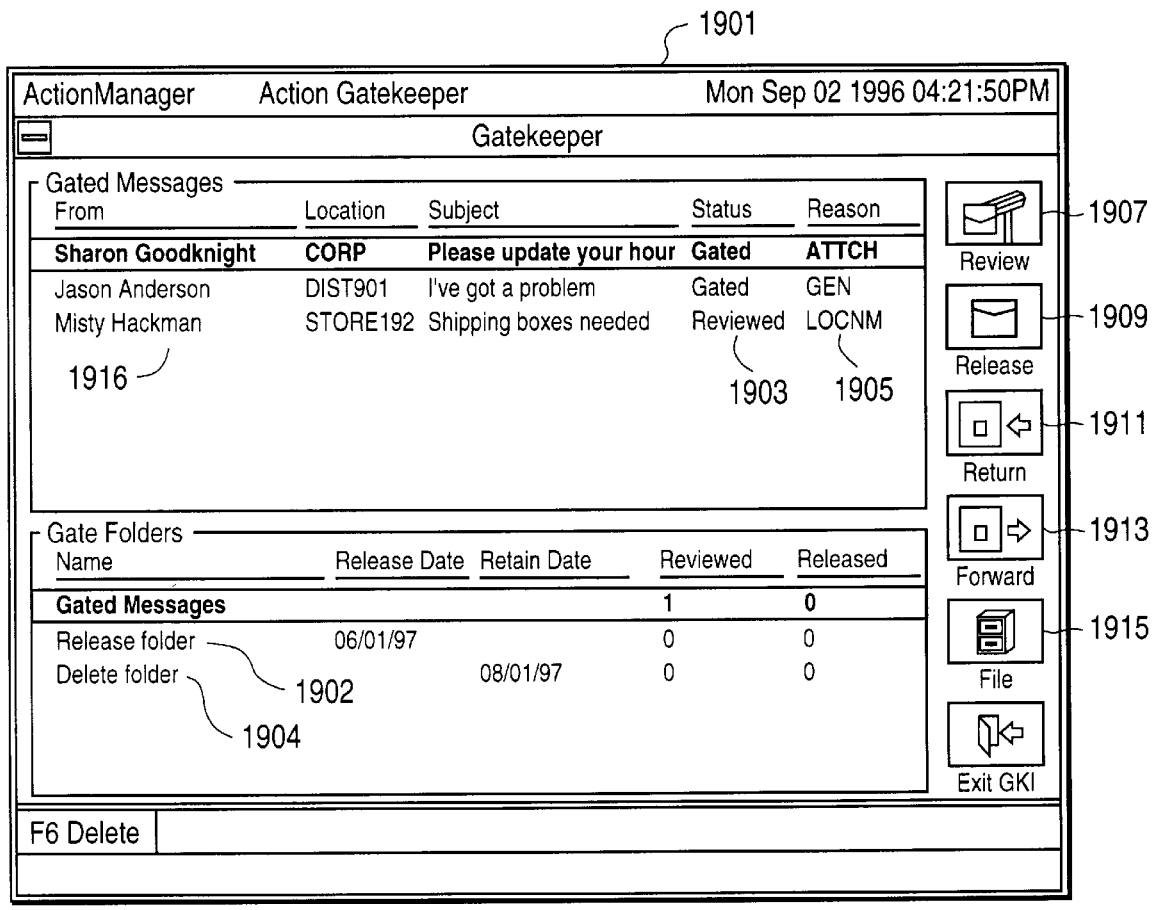
FIG. 19 is an illustration of a user interface for accessing gated messages in a gatekeeper's inbox.

In one embodiment, each folder has two time parameters associated with it: a release date and a retain date. The release date is the date on which all messages in the folder are released. The retain date is the date up to which all messages in the folder are retained, and then deleted on the specified date. Using these attributes, a gatekeeper can create any number of folders to release or delete gated messages after various times. The earliest time parameter is always executed first. FIG. 19, for example, shows a release folder 1902 with a release date of Jun. 1, 1997, and a delete folder 1904 with a retain date of Sep. 1, 1997.

In another embodiment, more sophisticated processing is provided with the folders. In this embodiment, each folder also has a time parameter, and an action associated with the folder. A folder action is a gatekeeper-defined action to be applied to the messages in the folder according to the time parameter. The actions include gating, forwarding, copying, deleting, or returning the messages. In addition, complex action sequences may also be defined by a gatekeeper, such as copying and then deleting messages. This flexible definition of the folder actions enables a gatekeeper to precisely control the processing applied to gated messages.

The time parameters may be either:

1. A delta time: This parameter specifies an amount of time after which a message in the folder is acted upon according to the folder action. The delta time is measured by the GPO 106 relative to a timestamp of the message.

2. A time interval: a periodic time interval for acting upon messages in the folder. All messages in the folder are acted upon according to the folder action at the same time upon expiration of the interval.

3. Fixed time: a specific date and/or time at which all messages in the folder are acted upon according to the folder action.

Generally, the inbox has a delta time parameter associated with it, while the other folders have a time interval parameter.

Each folder may also be associated with a gatekeeper role, which identifies the owner of the folder as the gatekeeper who created the folder. This allows the gatekeeper who created the folder to reset the time parameter and action.

An embodiment including two segregated message indices 285, 287 is desirable because it enables the rule engine 283 and the distribution engine 284 to very quickly distinguish gated messages which tend to have relatively long or persistent storage, from non-gated messages which are stored only on a temporary basis, without having to use processing time to filter the distinct types of messages from each other.

A gatekeeper accesses gated messages through the GKI 107. With this application, the gatekeeper manually reviews a gated message in an inbox assigned to that gatekeeper, and either directly acts upon the message to release, return, delete, copy, or edit the message, or delays disposition of the message by moving the message with one of the other folders which will be automatically processed at a later time. The GKI 107 also supports automatic processing of gated messages, as further explained below.

The REPOs 102 and the GPOs 106 are preferably implemented as software products executing on conventional server-class computers, such as Sun Microsystems Inc.'s SPARC™ based workstations and server, or IBM compatible computers based on Intel Inc.'s Pentium™ processors. The servers operate in conjunction with conventional operating systems, such as UNIX™, or Microsoft Corp.'s Windows95™ or WindowNT™.

IV. Operational Overview

Figure 4A:
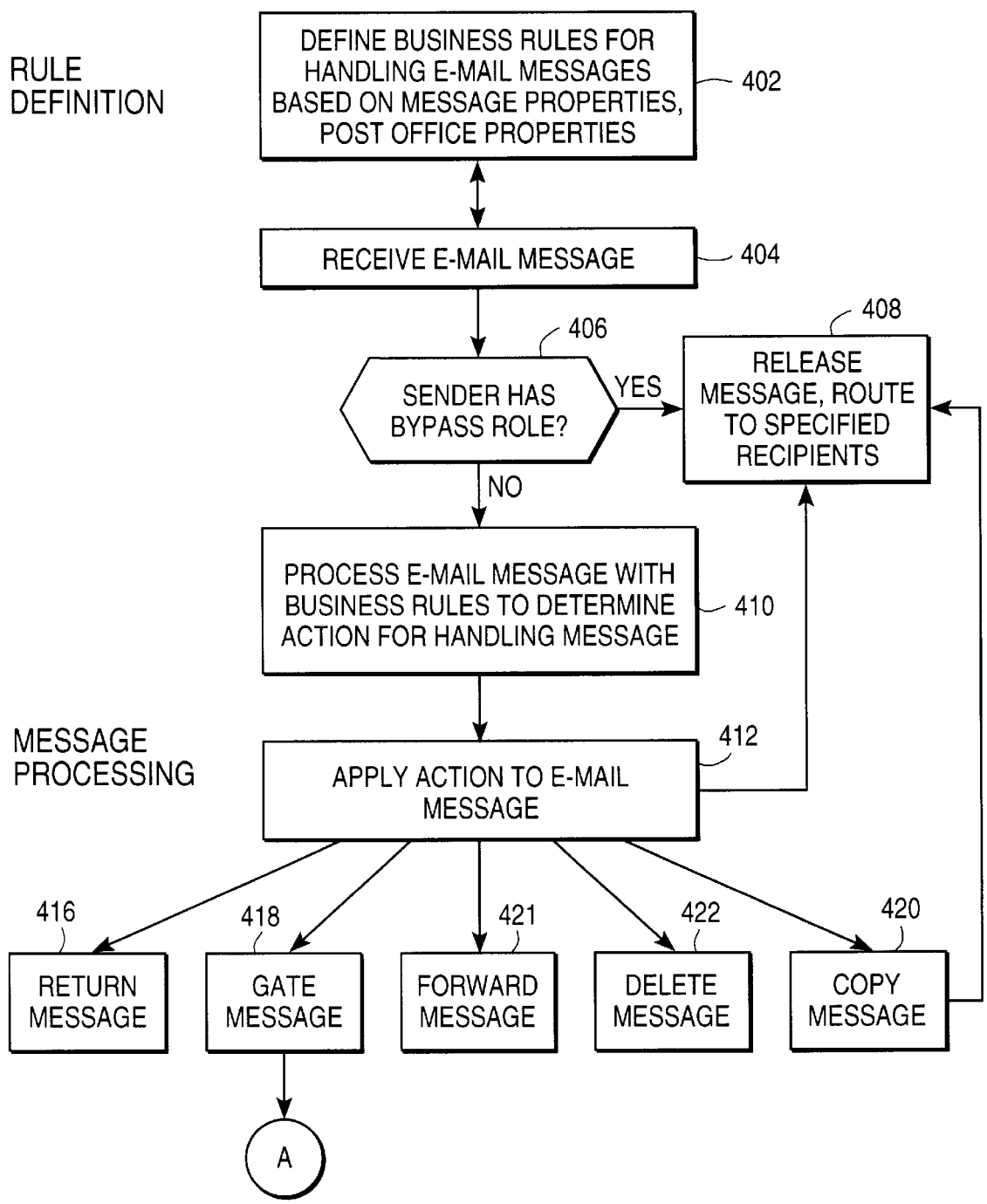
FIGS. 4A and 4B are flow diagram of the overall process of gatekeeping e-mail messages.
Figure 4B:
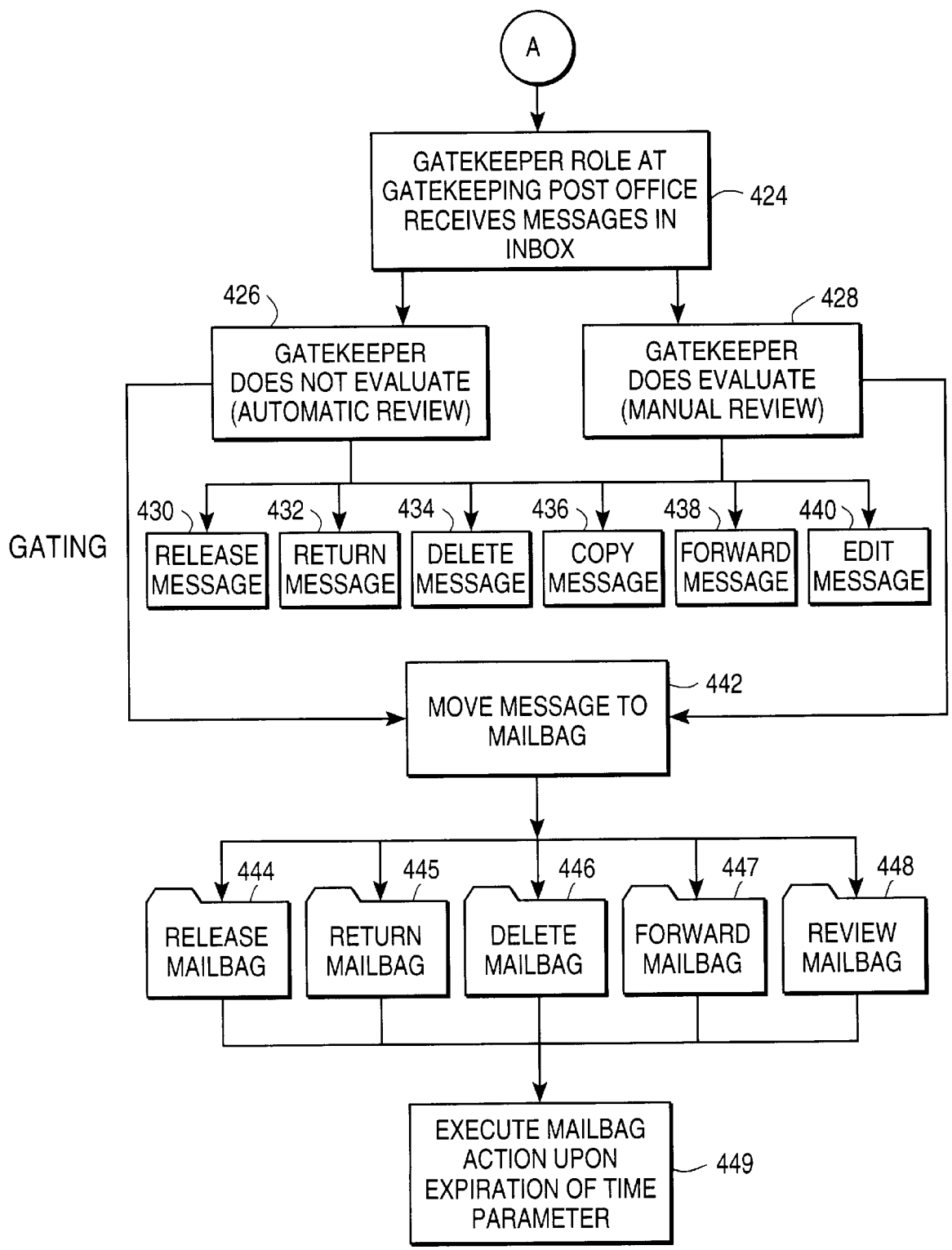

Referring now to FIGS. 4A and 4B, there is shown a flowgraph of the overall process of processing and gating e-mail messages in accordance with the present invention. Operation of an e-mail system in accordance with the present invention may be understood as having three distinct phases: rule definition, message processing, and gating.

During the rule definition phase, an administrator or gatekeeper defines 402 various business rules for handling e-mail messages. In one embodiment, the rules are defined using the GKADMIN 108 which can directly edit the rule base of any GPO 106 or REPO 102. The business rules are preferably consistent with the business communication policies used by the business, or may extend or modify such communication policies. These business rules are stored in the rule base 270 of one or more REPOs 102. In addition, business rules for handling gated messages are created and stored in the gatekeeping rule base 289 of one or more GPOs 106. It is anticipated that the business rules stored in the REPOs 102 will be different in some respect than those stored in the GPOs 106, since the function of a GPO 106 is to further process messages that have already once been processed and gated by a REPO 102.

In addition to defining various business rules for specific actions to be applied to messages, the administrator may also define bypass roles. A bypass role is an organizational position within the organization for which a message from a sender with a bypass role is passed through a REPO 102 without any other rule processing. For example, the president of the company would be a typical bypass role, and all messages from the president would then not be subject to the other rule processing or gating operations of a REPO 102. Thus, bypass roles are used to define the exceptional case of unabated delivery in the context of the invention. The bypass roles are defined with respect to company position, and not with respect to actual user names. This allows a change in the holder of the bypass role, without the administrator having to manually redefine the bypass role, as would be the case if the bypass ability were directly associated with a user name. The role information for bypass roles is held in the organizational database 111.

In the message processing phase, the REPOs 102 and GPOs 106 are operational for receiving and distributing messages. A message is received 404 at a REPO 102 from another post office or client application. With the REPO 102, the receipt engine 200 indexes the message in the message index 240 and provides it to the rule engine 210. The rule engine 210 checks 406 whether the sender has a bypass role. If so, the message is released 408 by the distribution engine 230. The message may be delivered to the specified recipients at other post offices, or it may be gated at a REPO 102 that does not recognize the particular bypass role.

If the sender of the message does not have a bypass role, the rule engine 210 processes 410 the message with the business rules in the rule base 270 to determine the appropriate action(s) for handling the message. Typically, at least one business rule will be satisifed, and thereby specify the action to be applied to the message. The action is communicated to the distribution engine 230, which applies 412 the action to the message. If there are multiple actions, the distribution engine 230 selects a highest priority action, and applies it to the message. The distribution engine 230 may release 408, return 416, gate 418, copy 420, forward 421, or delete 422 the message. When a message is gated 418, it is not delivered to its initially specified recipients. Instead, the gating action specifies a gatekeeper role at a GPO 106 who is to review the message. Accordingly, the distribution engine 230 sends the message to this gatekeeper. When a message is forwarded 421, it is delivered to a new recipient, typically one other than a specified recipient; the new recipient is specified by the applicable business rule which was satisfied.

A REPO 102 operates continuously in this mode of receiving and processing messages. A GPO 106 which includes rule processing functionality on incoming messages also operates in this manner with respect to non-gated messages.

The gating phase is applied by a GPO 106 to messages that have been gated 418 by a REPO 102 or other GPO 106. A gated message is received 424 at a GPO 106, indexed in the gatekeeping message index 287 and initially placed in an inbox for the gatekeeper to whom the message has been gated.

The present invention provides for two types of gatekeeping review, manual review and automatic review. Each of these types of reviews may result in actions that are immediately executed, or actions for which execution is delayed.

During manual review, the gatekeeper evaluates 428 any or all of the messages in the inbox, and may immediately execute an action on the message, including releasing 430 the message, returning 432 the message to its sender (with or without an explanation as to why it was returned and not delivered), deleting 434 the message, copying 436 the message, and gating the message by forwarding 438 it to yet another gatekeeper, or otherwise forwarding 438 the message to another recipient for further handling. In addition, the gatekeeper can edit 440 a message, for example to remove offensive language, delete an attachment, or the like. After editing, the gatekeeper can release 430 the message for further delivery (to the specified recipients or other recipients), or return 432 it to the sender with an explanation of why the message was not delivered.

Alternatively, the gatekeeper may decide to delay execution of an action such that it is applied to a set of messages instead of individually. For delayed execution, the gatekeeper moves 442 a message to a mailbag which has a defined time parameter. The mailbag may have a specifically defined action, such as a release mailbag 444, a return mailbag 445, a delete mailbag 446, a forward mailbag 447, or a review mailbag 448, or it may simply have a release and retain date. The GPO 106 periodically checks the time parameters of the various mailbags and executes 449 an appropriate action for each mailbag upon expiration of its time parameter. For example, a delete mailbag 446 may have an interval time parameter of 30 days; all messages in this mailbag are deleted once every 30 days. Alternatively, a release mailbag 444 may have a specific release date, and the GPO 106 checks to see if the current date matches the release date, and if so, releases the messages in the mailbag. This approach lets a gatekeeper manually review some messages and immediately act on some messages, while delaying actions on other messages.

In addition, the gatekeeper may review the message and not perform any action on it at all, including not releasing the message. In this instance, the message simply remains in the gatekeeper's inbox.

Automatic review is also provided by the GPO 106, for example as part of its basic functionality or program executive. For those messages which the gatekeeper does not evaluate 426 or which remain in the inbox, the GPO 106 operates a daemon process, and periodically wakes up and processes all messages in the gatekeeper's inbox. The inbox has a timer associated with it. Here however, the timer is treated as relative value, instead of an absolute period. When a gated message is received, the timer is added to the message date to define an expiration date for the message. Thus, each message in the inbox may have the different expiration date, whereas in each mailbag, all of the messages therein will have a same expiration date.

When the GPO 106 traverses the inbox, it checks the expiration date of each message against the current date to determine if the message has expired. If the message has expired, the GPO 106 invokes the rule engine 283, which processes the message against the rules in the gatekeeping rule base 289 to determine an appropriate action. This action may be any of the actions described above (release, delete, copy, forward, return). Alternatively, the action may be to move the message into one of the mailbags, such that the GPO 106 executes 449 the appropriate action for that mailbag upon expiration to the time parameter for that mailbag, as described above.

The operations of the GPO 106 and REPO 102 are concurrent and independent of each other.

As noted, a gatekeeper at a GPO may manually gate a message to another GPO 106. Also, a message may be automatically gated by one GPO 106 to another GPO 106, where it may be reviewed independently by another gatekeeper, or again, automatically by that second GPO 106. This feature allows for either hierarchical or distributed gatekeeping of messages by any number of independently operating GPOs. That is, a message may be processed through a series GPOs 106, each of which may apply its own set of rules for processing and further handling the message. Thus, while a first or second GPO 106 may not delete or return a message, an nth GPO 106 may in fact delete the message or simply release it to its specified recipients.

The three phases of rule definition, message processing, and gating are illustrated in FIGS. 4A and 4B in a linear fashion, but it is understood that the distinct phases can operate concurrently with each other. That is, once rules are defined, the message processing phase operates as its own process on any number of REPOs 102. Similarly, the gating phase occurs concurrently at various GPOs 106. Thus, each phase contributes independently to the overall operation of the system.

The operation of the REPOs 102 and GPOs 106 is here described with respect to e-mail messages. However, the present invention and the described embodiments are not limited to processing e-mail messages. The present invention and the described embodiments also operate on any other types of data objects that may be distributed over a network. For example, a data server may be used in an organization to route data objects such as forms, spreadsheets, applets, code objects, database information, or any other type of data directly from a sender to any number of specified recipients, without being attached to an e-mail message. The present invention enables the business rules to be applied to any such data objects at a REPO 102, and gated, if a rule is satisfied, to a GPO 106 for further review. For example, a business rule may be defined to return to sender any code object larger than a specified size, or to gate forms having a specific data type. This general ability of the present invention to apply business rules to any type of data object provides substantial control and flexibility in the management of corporate communications.

V. Establishing Business Rules

Figure 5:
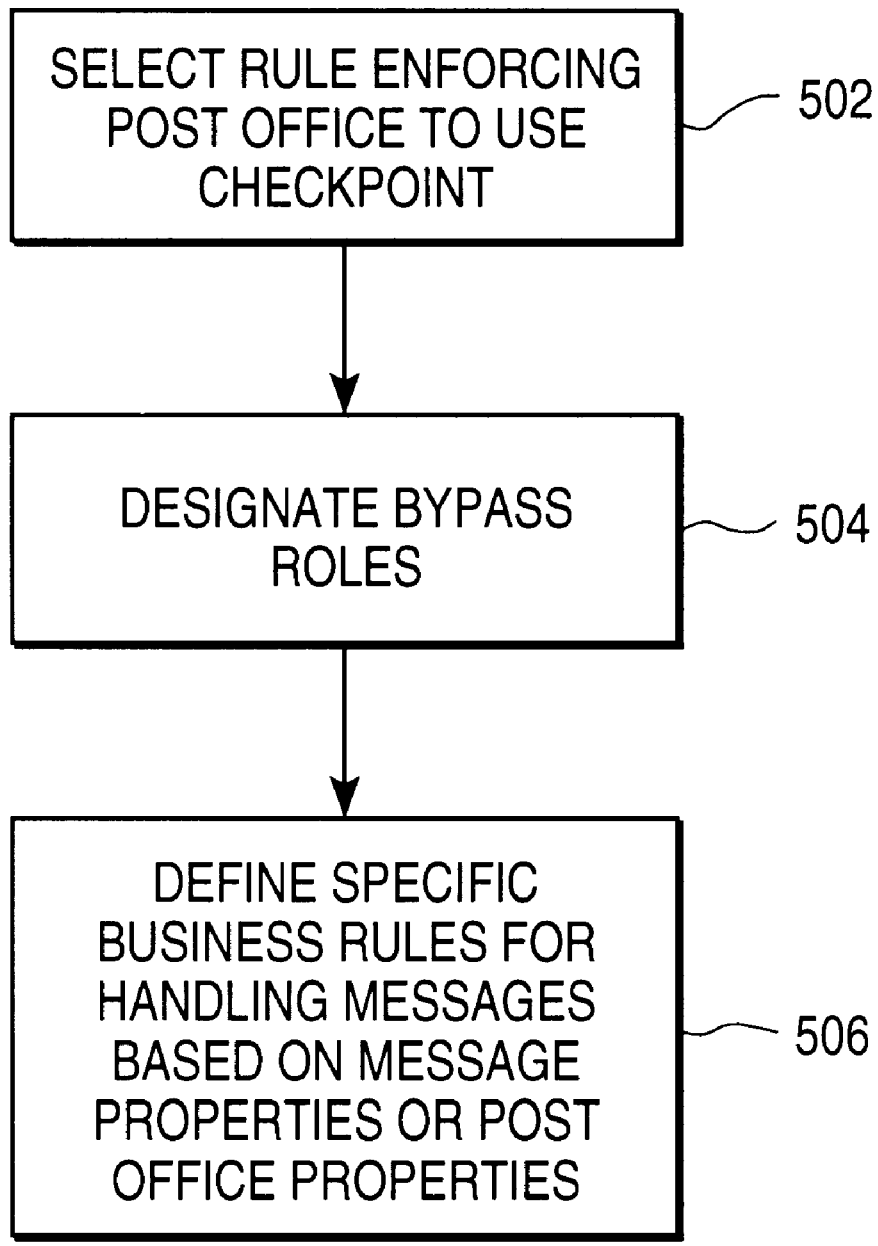
FIG. 5 is a flow diagram of the process of defining business rules within the rule base.
Figure 6:
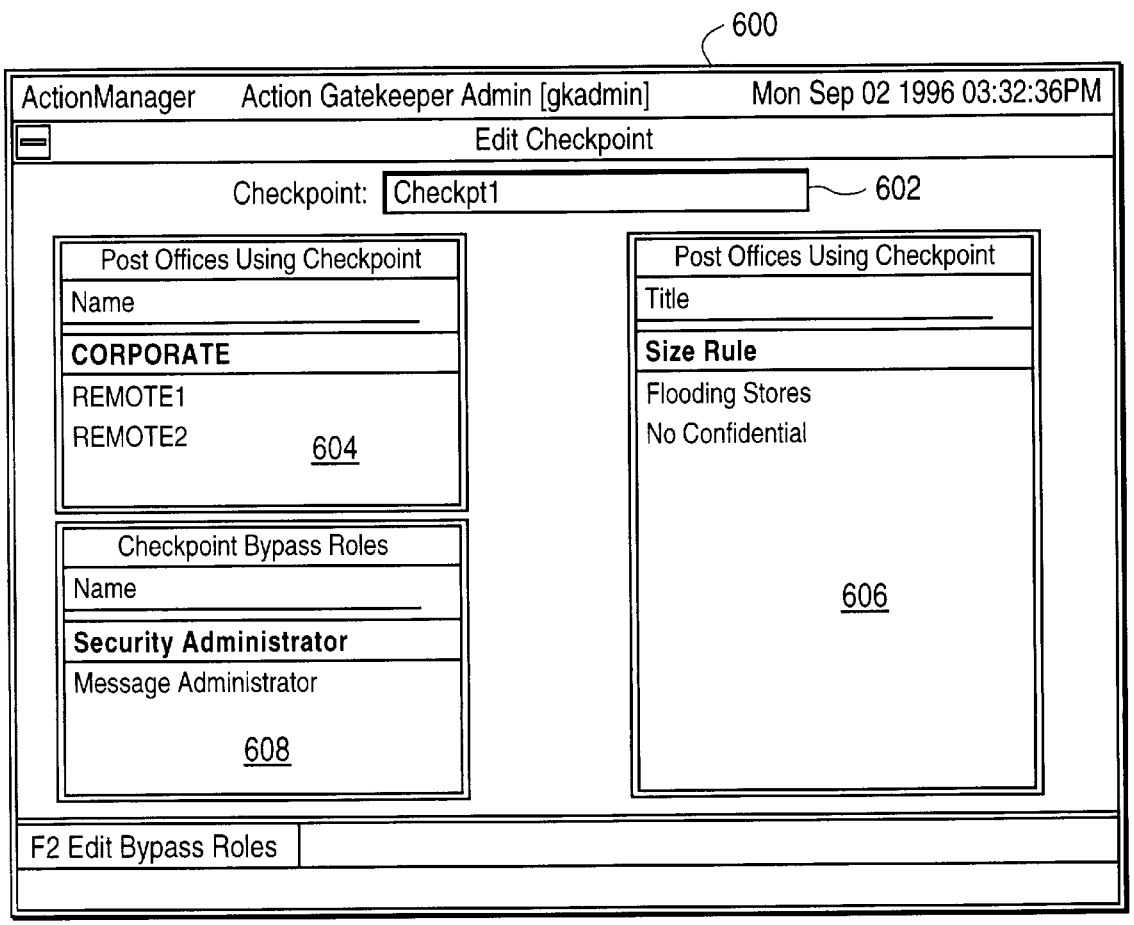
FIG. 6 is an illustration of a user interface for selecting rule enforcing post office to use a checkpoint.

Referring now to FIG. 5, there is shown a flow diagram of the process of defining business rules for a rule base 270 or GRB. Rule definition proceeds with the administrator selecting 502 a REPO 102 for using a particular checkpoint or set of business rules. FIG. 6 illustrates one user interface 600 for selecting a REPO 102, as provided by the GKADMIN 108. Checkpoint field 602 indicates the name of a selected checkpoint. The post office or post offices which are available to use the checkpoint are listed in window 604. The user selects one or more of these post offices to use the named checkpoint. The business rules defined within the checkpoint are listed in window 606 so that the administrator can determine the content of the checkpoint.

Figure 7:
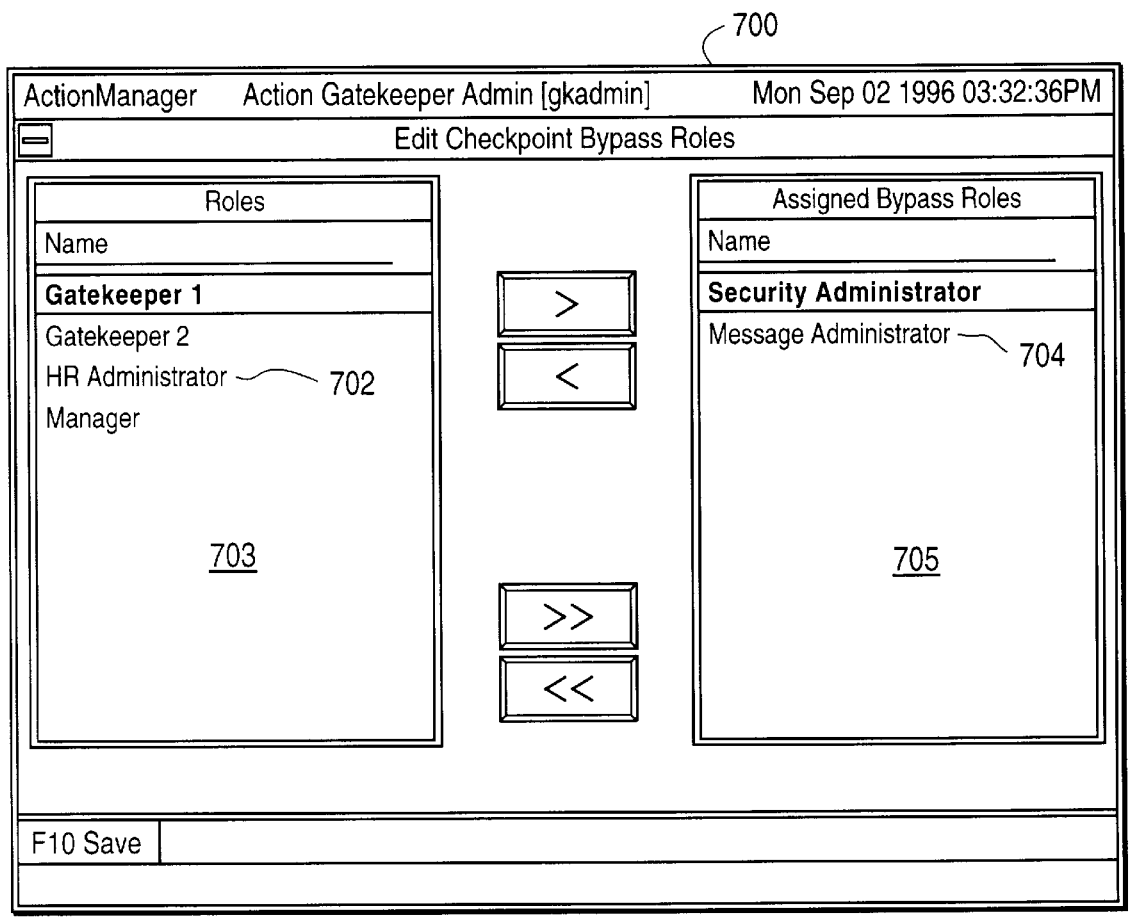
FIG. 7 is an illustration of a user interface for designating checkpoint bypass roles.

The administrator then designates 504 the bypass roles applicable to the checkpoint. The current bypass roles are listed in window 608. The administrator defines new bypass roles by designating various positions within the organization. FIG. 7 illustrates a sample user interface 700 for designating bypass roles. Available roles 702 within the organization are shown in window 703. To obtain this role information, the GKADMIN 108 queries the organizational database 111 for all available roles 702. These roles 702 are then listed by the GKADMIN 108 in window 703. The administrator selects one or more of these roles 702 and moves them over to the assigned bypass roles window 705, where they are listed as bypass roles 704. The implementation of bypass roles within the REPO 102 may vary. In one embodiment, bypass roles are implemented in the same fashion as other business rules, further described below.

The administrator next defines 506 any number of business rules for the checkpoint. These rules are stored within the rule base 270 of the REPO 102 or GPO 106 for which the checkpoint is being defined. Each rule defines a specific action to be taken when an attribute of a message or data object satisfies an operator with respect to a user-defined value. The attributes may be static attributes of the message, such as message size, identity or number of recipients, number of destinations, message priority, message type, the text of the message, the subject line of the message, number of attachments, or the like.

Attributes may also be defined by performance or statistical attributes of the REPO 102 itself. Useful performance or statistical data include the number of messages processed per hour by the post office, the average size of messages processed per hour, the average number of attachments per message, largest message size in past hour, largest attachment size, and so forth. Those of skill in the art will appreciate that many other performance or statistical measures may be used as attributes for rule processing.

Each data object has various properties, such as being a message, attachment, and so forth. Each property has a name and an attribute. For example, the attachment property of a message has attributes such as the number, size, largest size, smallest size attachment. Any of the various attributes of a property can be the basis for an action by the distribution engine 230.

Operators include arithmetic operators (=, <, >, _, $^2$, $^3$) and content-oriented operators (has does not have; is in: is not in). Values may be numeric, text, or labels.

Business rules within a checkpoint may be classified (for purposes of explanation) into various classes: attachment rules, destination rules, destination level rules, message rules, sender rules, and post office rules according to the property of interest. Tables 1 through 6 describe each of these rule classes. Each table lists the available operators and values used to define the rule for each property and attribute.

TABLE 1

Attachment Rules

| Property | Attribute | Operator | Value |
| --- | --- | --- | --- |
| Attachments | Total count | Equals, Not equal, Greater or equal, Less or equal, Greater, Less | Specific number |
|  | Memo count (number of memo attachments) | Equals, Not equal, Greater or equal, Less or equal, Greater, Less | Specific number |
|  | File count (number of file attachments) | Equals, Not equal, Greater or equal, Less or equal, Greater, Less | Specific number |
|  | Other count (number of attachments of, types other than, memo or file | Equals, Not equal, Greater or equal, Less or equal, Greater, Less | Specific number |
|  | Attachment size, (total) (total size of all attachments) | Equals, Not equal, Greater or equal, Less or equal, Greater, Less | Specific size in (kilobytes) |
|  | Largest, attachment size | Equals, Not equal, Greater or equal, Less or equal, Greater, Less | Specific size in (kilobytes) |
|  | Smallest, attachment size | Equals, Not equal, Greater or equal, Less or equal, Greater, Less | Specific size in (kilobytes) |

TABLE 2

Destination Rules

| Property | Attribute | Operator | Value |
| --- | --- | --- | --- |
| Destination | Contains list | Equal, Not equal | Yes or No |
|  | Number of recipients | Equals, Not equal, Greater or equal, Less or equal, Greater, Less | Specific number |
|  | Number of locations | Equals, Not equal, Greater or equal, Less or equal, Greater, Less | Specific number |
|  | Distribution list | Has, Does not have | Specific distribution, list |
|  | Locations | Has, Does not have Is In, Is Not In | Specific post office Specific distribution, list |
|  | Role | Has, Does not have | Specific role |

TABLE 3

Destination Level Rules

| Property | Attribute | Operator | Value |
|---|---|---|---|
| Destination, Level | Level name | Equals, Not equal, Greater or equal, Less or equal, Greater, Less | Specific level |

TABLE 4

Message Rules

| Property | Attribute | Operator | Value |
|---|---|---|---|
| Message | Revisable | Equals | Yes or No |
|  | Confidential | Equals | Yes or No |
|  | Priority | Equals, Not Equal | Low, Medium, or High |
|  | Size (in Kb) | Equals, Not equal, Greater or equal, Less or equal, Greater, Less | Specific size (in kilobytes) |
|  | From/MSG Type | Equals, Not equal | A Form or A Message |
|  | From Program | Equals, Not equal | Yes or No |
|  | To Program | Equals, Not equal | Yes or No |

TABLE 5

Sender Rules

| Property | Attribute | Operator | Value |
|---|---|---|---|
| Sender | Role | Has, Does not have | Specific role |
|  | Post Office | Equals, Not equal Is In, Is Not In | Specific post office Distribution list |

TABLE 6

Post Office Rules

| Property | Attribute | Operator | Value |
|---|---|---|---|
| Post Office | Messages Per Hour | Equals, Not equal, Greater or equal, Less or equal, Greater, Less | Specific number |
|  | Average Message Size | Equals, Not equal, Greater or equal, Less or equal, Greater, Less | Specific number |
|  | Largest Attachment Size | Equals, Not equal, Greater or equal Less or equal, Greater, Less | Specific number |

FIG. 8 illustrates a sample user interface 800 of the GKADMIN 108 for defining business rule. Each rule has a user-supplied name 802 or description for easily identifying the rule. Each rule has an antecedent and a consequent. To define the antecedent, the administrator selects the property 804 and attribute 803 upon which the rule operates from drop down menus containing alternatives for these aspects of the rule. The administrator also selects an operator 806 as appropriate for the designated property the available operators are updated by the GKADMIN 108 according to the selected property and attribute. The administrator then supplies or selects a value 808 of the appropriate type. The GKADMIN 108 provides for type checking to ensure that the rule is well formed.

A business rule may have multiple conjuncts or disjuncts; the administrator indicates whether these apply and their type through buttons 810.

Once the antecedent is defined, the administrator defines the rule consequent by specifying the action to be applied to a message satisfying the antecedent conditions. The action is specified in action menu 812, and includes, as set forth previously, the actions of releasing, deleting, gating, copying, forwarding, or returning the message. Other user defined actions may also be implemented. A reason 814, a user input text entry, may be optionally specified. This is particularly useful when the action is to return the message to the sender, or to gate the message, and thereby inform either the sender or the gatekeeper of the reason(s) why a message was not delivered.

Where the specified action is to gate the message, as shown in the example of FIG. 8, the administrator specifies the destination by indicating in the gatekeeper address 816 the destination GPO 106 to receive the message, and the particular gatekeeper role within that GPO 106 for reviewing the message. When the action is executed, the message is delivered to the gatekeeper having the specified role.

As indicated by the various possibilities in Tables 1–6, there is a large variety of different types of business rules that may be constructed. Table 7 includes examples of useful business rules for use at a REPO 102:

TABLE 7

Sample Business Rules

| Antecedent | | | | Consequent |
|---|---|---|---|---|
| Property | Attribute | Operator | Value | Action |
| Message | Size | > | 100 kb | Return to Sender |
| Message | Text | Has | "Product X" | Forward to Marketing Dept. |
| Attachments | Number | > | 10 | Return to Sender |
| Destination | Role | Has | President | Gate to Gatekeeper |
| Sender | Role | Has | President | Copy and Release |
| Server | Message Load | > | 100 messages | Return to Sender |

The rules may be internally stored with the rule base 270 or gatekeeping rule base 289 by any of a number of useful implementing data structures. In one embodiment, the rules may be stored in tables in a relational database.

Figure 9:
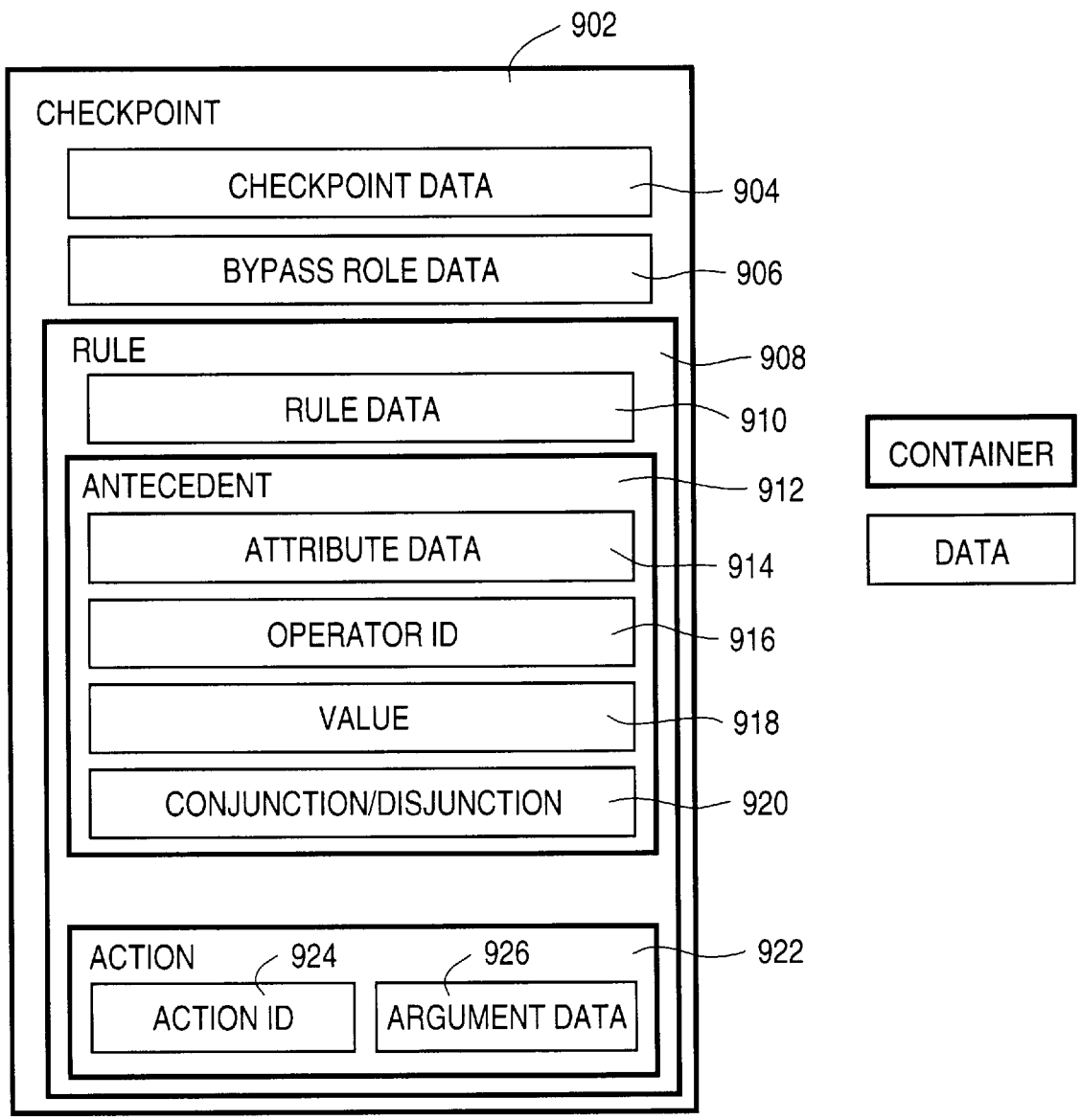
FIG. 9 is an illustration of a code point model for storing business rules.

In another embodiment, the rules are encoded in code point structures, as more completely described in "Data Management Using Nested Records And Code Points," U.S. Pat. No. 5,634,123. FIG. 9 illustrates the code point model for a checkpoint and set of rules. In this embodiment, checkpoints 902 are container records that encapsulate further containers for rules. Each checkpoint container 902 includes checkpoint data 904, for example, specifying the checkpoint name, the number of rules, number of bypass roles, and other checkpoint specific data. Bypass role data 906 may also be specified using links to the organizational database 111.

Each rule container 908 encapsulates one or more antecedent containers 912 and an action container 922 for the rule action. Each antecedent container 912 includes data records for the attribute 914, operator 916, and value 918 specified for the rule. The attributes, operators, and actions are encoded with identification numbers, which the rule engine 210 engine uses to decode their specific meaning. There is alsoa value stored 920 indicating whether or not there is another conjunct or disjunct in the rule. The action container 922 includes the encoded action data 924, and any arguments 926, such as destination address for gating or returning the message.

VI. Applying Business Rules to E-mail Messages

Figure 10:
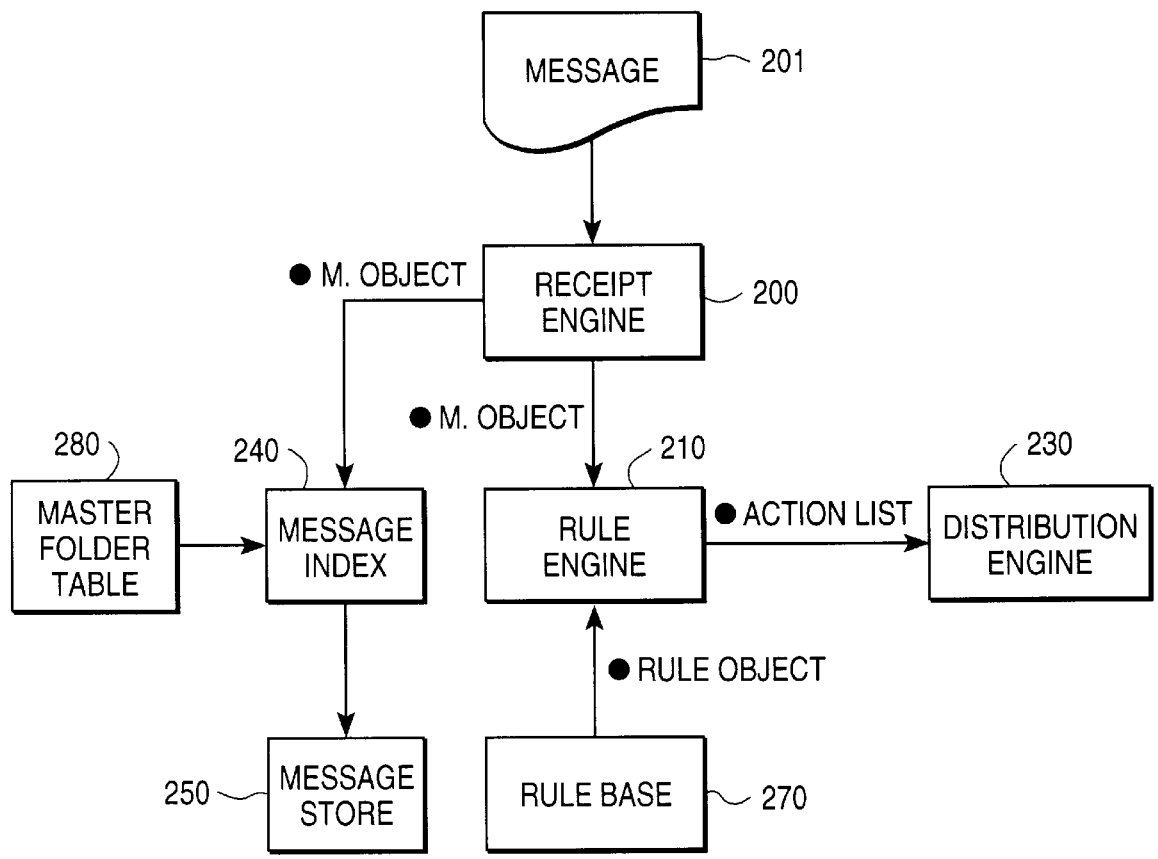
FIG. 10 is an illustration of the data flow within a rule enforcing post office.

Referring now to FIG. 10, there is shown an illustration of the data flow within a REPO 102. Processing within a REPO 102 begins with the receipt of message data 201 by the receipt engine 200. For receiving an e-mail message a receipt engine 200 provides conventional post office functionality. Generally, the receipt engine 200 establishes a connection with a client e-mail application or other message source, and exchanges parameters for initialization of the data transfer. The receipt engine 200 then receives the message data 201. Upon completion of the receipt of the message data 201, the receipt engine 200 terminates the connection. This process is repeated each time a message is received.

As the message data 201 is being received, the receipt engine 200 constructs a message object out of the message data 201. Each message object has interfaces for accessing and manipulating data from its header components, message text, attachment, and other attributes and properties. After the message object is constructed, the receipt engine 200 passes a handle to the message object to the rule engine 210, which can then obtain the message object for applying the rules thereto. The receipt engine 200 also provides the message object to the message index 240 for indexing and storage in the message store 250.

Some of the messages that a REPO 102 receives may have already been processed by another REPO 102 and gated for delivery to a GPO 106. The messages are identified by the receipt engine 200 as being wrapped messages, and are provided by the receipt engine 200 directly to the distribution engine 230 for distribution. Wrapped messages are further explained below.

The rule engine 210 receives the message from the receipt engine 200, and processes it using the rules from the checkpoint assigned to the REPO 102. For each message, the rule engine 210 generates an action list of one or more actions to be performed by the distribution engine 230 on the message. The action list may be associated with the message by an object handle or other association.

The distribution engine 230 traverses the action list for the message, and applies the action having the highest priority.

Rule Processing

Figure 11:
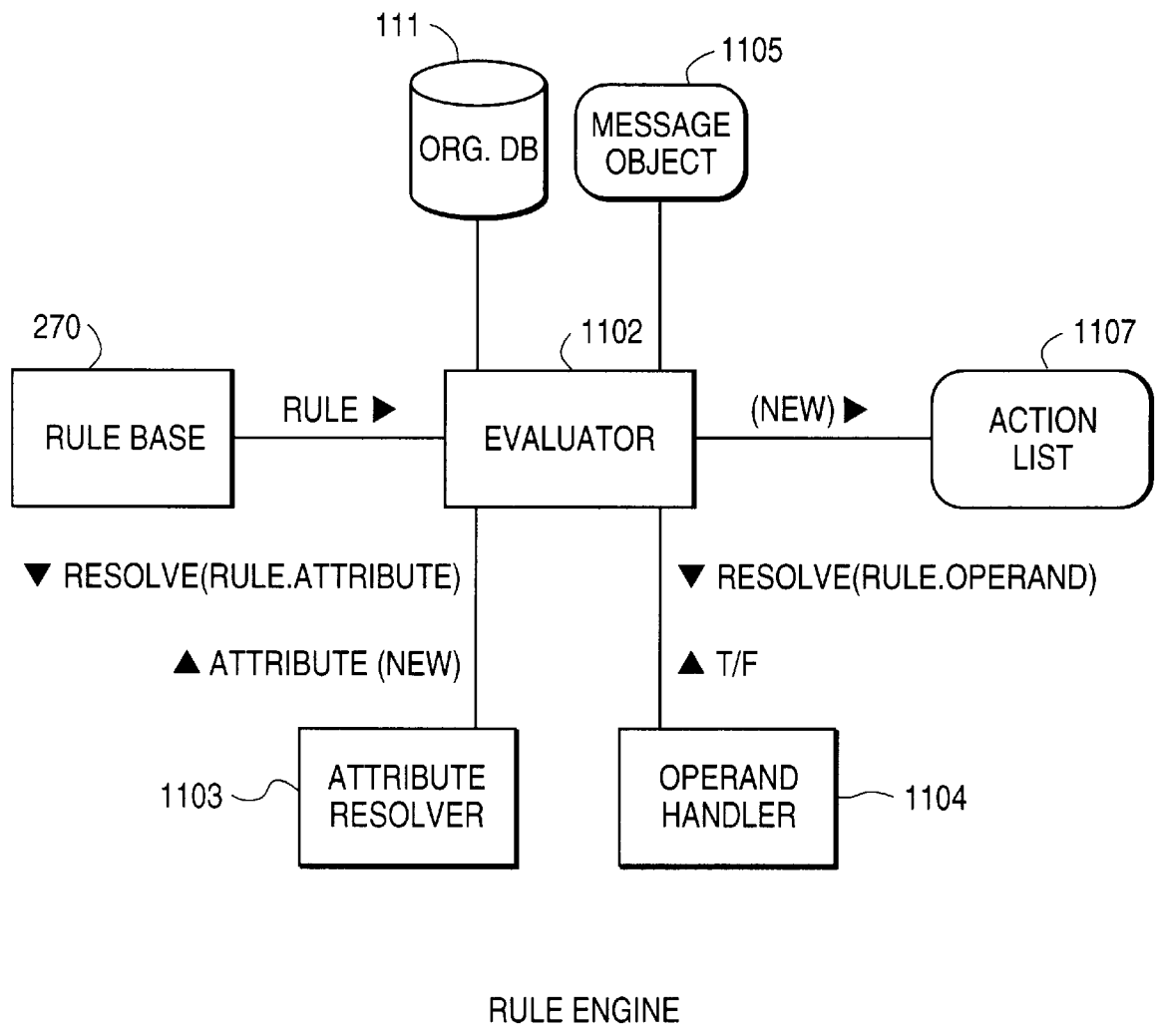
FIG. 11 is an illustration of the data flow within a rule engine for processing a message using the rule base.

Referring now to FIG. 11, there is shown the data flow within a rule engine 210 for processing a message. The rule engine 210 holds references to the rule base 270 for obtaining rules therefrom. The rule engine 210 also holds a reference to the distribution engine 230 for invoking distribution of a message and passing the distribution engine 230 the action list 1107 for the message.

The rule engine 210 comprises three components, an attribute resolver 1103, an operand handler 1104, and an evaluator 1102. The evaluator 1102 controls the overall evaluation of a message against all rules in a checkpoint. For each rule, the evaluator 1102 uses the attribute resolver 1103 to determine the attributes of the rule and the corresponding attributes of the message, and uses the operand handler 1104 to determine whether the attributes of the message satisfy the operand and value of the rule. The attribute resolver 1103 returns a new attribute object with its value to the evaluator 1102, and the operand handler 1104 returns a truth value.

Because a message may satisfy any number of rules within a checkpoint, the evaluator 1102 outputs an action list object 1107 which stores the actions from those rules that were satisfied. The action list 1107 includes a message ID which identifies the message and a list of actions as encoded values with their optional arguments.

Figure 12:
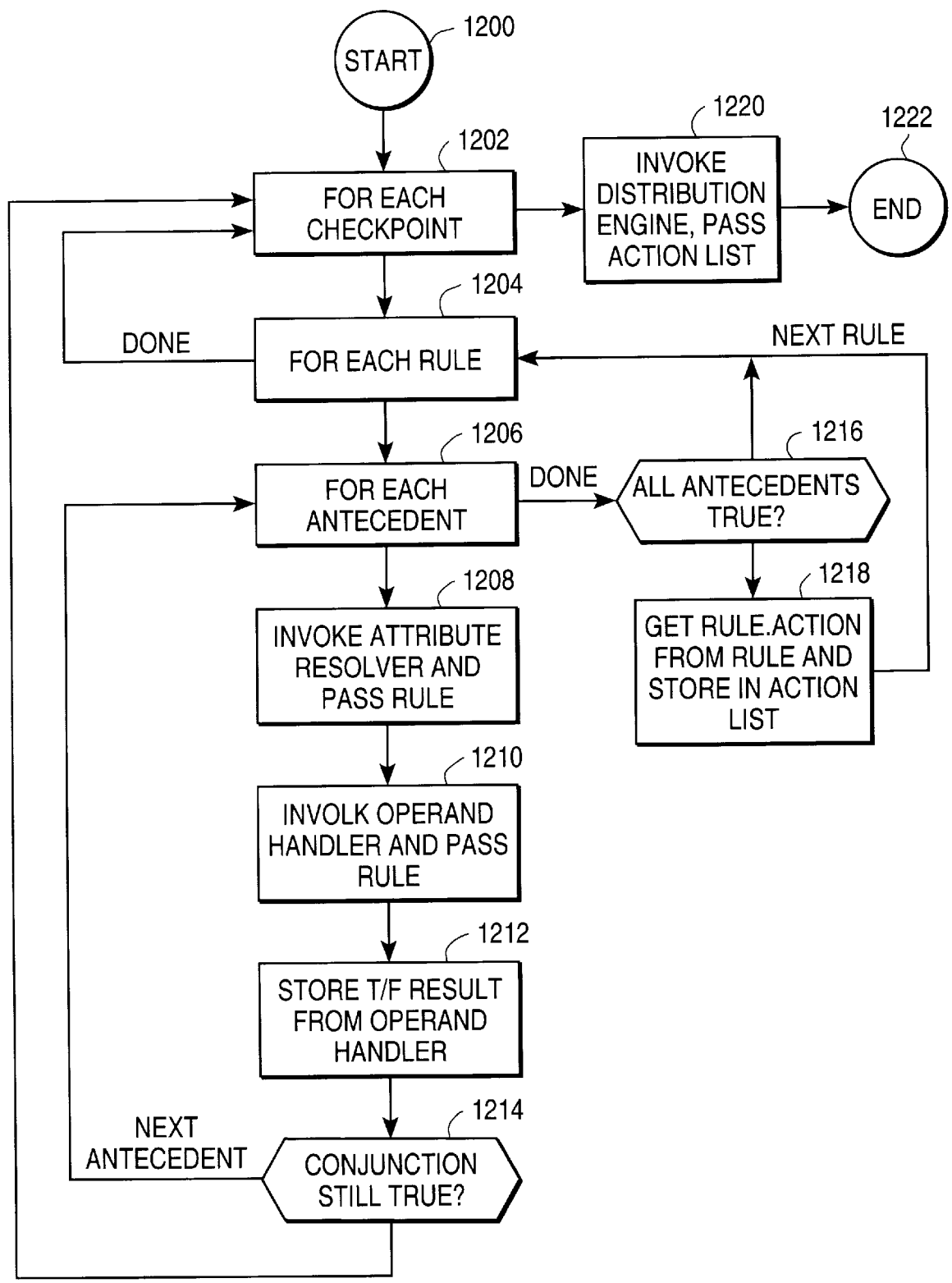
FIG. 12 is a flow diagram of the operation of the evaluator for evaluating an e-mail message with respect to the rule base.

As noted above, the evaluator 1102 performs a high level true/false analysis over an entire checkpoint with respect to a set of rules. Referring to FIG. 12 there is shown a flow diagram of the operation of the evaluator 1102 for evaluating a particular message.

The evaluator 1102 receives a handle to the message from the receipt engine 200. The evaluator 1102 then traverses 1202 the rule base 270 for each checkpoint assigned to it. For each rule in the checkpoint (1204), the evaluator 1102 evaluates the antecedents of the rule with respect to the attributes of the message or performance attributes of the REPO 102. For each antecedent (1206), the evaluator 1102 invokes 1208 the attribute resolver 1103 and passes in the rule.

The attribute resolver 1103 is a state machine the calls the appropriate interface of a rule to obtain an attribute, and interfaces of a message to obtain an attribute thereof. The attribute resolver 1103 also holds reference to the receipt engine 200, the distribution engine 230, and the organizational database 111 in order to obtain role information, or other attribute information. The attribute resolver 1103 returns an attribute object which includes the value of the attribute extracted from the message, or from the distribution engine 230, and its type.

The attribute resolver 1103 operates as follows: The attribute resolver 1103 receives a reference to a message object and a reference to a rule object. The attribute resolver 1103 gets the attribute of the rule object. The attribute resolver 1103 then calls either the message object or the distribution engine 230 in order to obtain the appropriate attribute information. As noted above, the attribute information may be external to the rule, such as the performance data of the distribution engine 230, or other other statistical data from the post office.

For message attributes, the attribute resolver 1103 requests the message to provide the attribute information for the specific attribute. For example, the attribute resolver 1103 will determine that the attribute of particular rule is the "message size." The attribute resolver 1103 then invokes the message to determine the corresponding attribute information from the message. In this example, the attribute resolver 1103 would obtain the size of the message. The attribute resolver 1103 then stores this message attribute information in a local cache.

For an aggregate or performance attribute of the distribution engine 230, the attribute resolver 1103 calls the distribution engine 230 to obtain the required data. For example, the attribute of the rule may be the server load, in which case the attribute resolver 1103 calls the distribution engine 230 to provide this data, which is again stored in a local cache.

With the attribute information, the attribute resolver 1103 constructs an attribute object that stores the attribute data and its type. The attribute resolver 1103 then returns this attribute object to the evaluator 1102.

For bypass roles, the attribute resolver 1103 invokes the organizational database 111 to determine the role of a particular user, and this information is stored in the attribute object.

After receiving the attribute object from the attribute resolver 1103, the evaluator 1102 invokes 1208 the operand handler 1104, and passes the rule and the attribute object to the operand handler 1104. First, the operand handler 1104 determines whether it is necessary to query the rule object to obtain more information than is available directly from the message, such as the uncompressed size of an attachment, an aggregate value that covers the domain of the message, or the run time environment of the REPO 102 or GPO 106. The operand handler 1104 calls the attribute object to obtain the value of the attribute. The operand handler 1104 calls the rule object to obtain the value specified in the rule. The operand handler 1104 then compares the attribute value with the rule value using the operand from the rule. If the comparison is true, the operand handler 1104 returns "true" to the evaluator 1102, meaning the rule was satisfied. Otherwise, the operand handler 1104 returns "false."

For example, assume a rule:

IF message size>100 kb THEN Return message.

Further assume a message with a message size of 50 kb.

Here the attribute resolver 1103 receives the message object, obtains the message size, and constructs an attribute object storing the value of "50", and passes this object back to the evaluator 1102. The evaluator 1102 calls the operand handler 1104 with the attribute object and rule object. The operand handler 1104 calls the rule object and obtains a value of "100" from the rule, and an operator of ">". The operand handler 1104 performs the greater than comparison of 50>100, which evaluates to "false." This result is returned to the evaluator 1102 as the evaluation of the current antecedent.

The evaluator 1102 stores 1212 the result from the operand handler 1104, and then tests 1214 whether the conjunct of the rule is true. If the rule conjunct is true, the evaluator 1102 proceeds with the next antecedent. If the rule conjunct is not true, the evaluator 1102 proceeds with the next rule, since the current rule had a false conjunct, and thus failed to be satisfied.

When all antecedents are evaluated, the evaluator 1102 determines 1216 if all of the antecedents are true. If so, the evaluator 1102 obtains 1218 the action from the rule and stores the action in the action list, constructing a new action list object as necessary. The evaluator 1102 proceeds to evaluate the next rule.

Once all rules in a checkpoint are evaluated, the evaluator 1102 proceeds with the next checkpoint until done. The evaluator 1102 then invokes 1220 the distribution engine 230 and passes the action list to it for handling.

Referring to FIG. 4A, bypass role processing 406 is handled by a set of rules, each of which define a bypass role in the antecedent, and a release action as the consequent. These rules are stored in a primary checkpoint which is evaluated (1202) as the first checkpoint during rule processing by the evaluator 1102.

The operation of the rule engine 210 is equally applicable to data objects other than e-mail messages, with the rule engine 210 and its components obtaining the appropriate attributes of a data object for applying a business rule thereto.

Action List Processing

Figure 13:
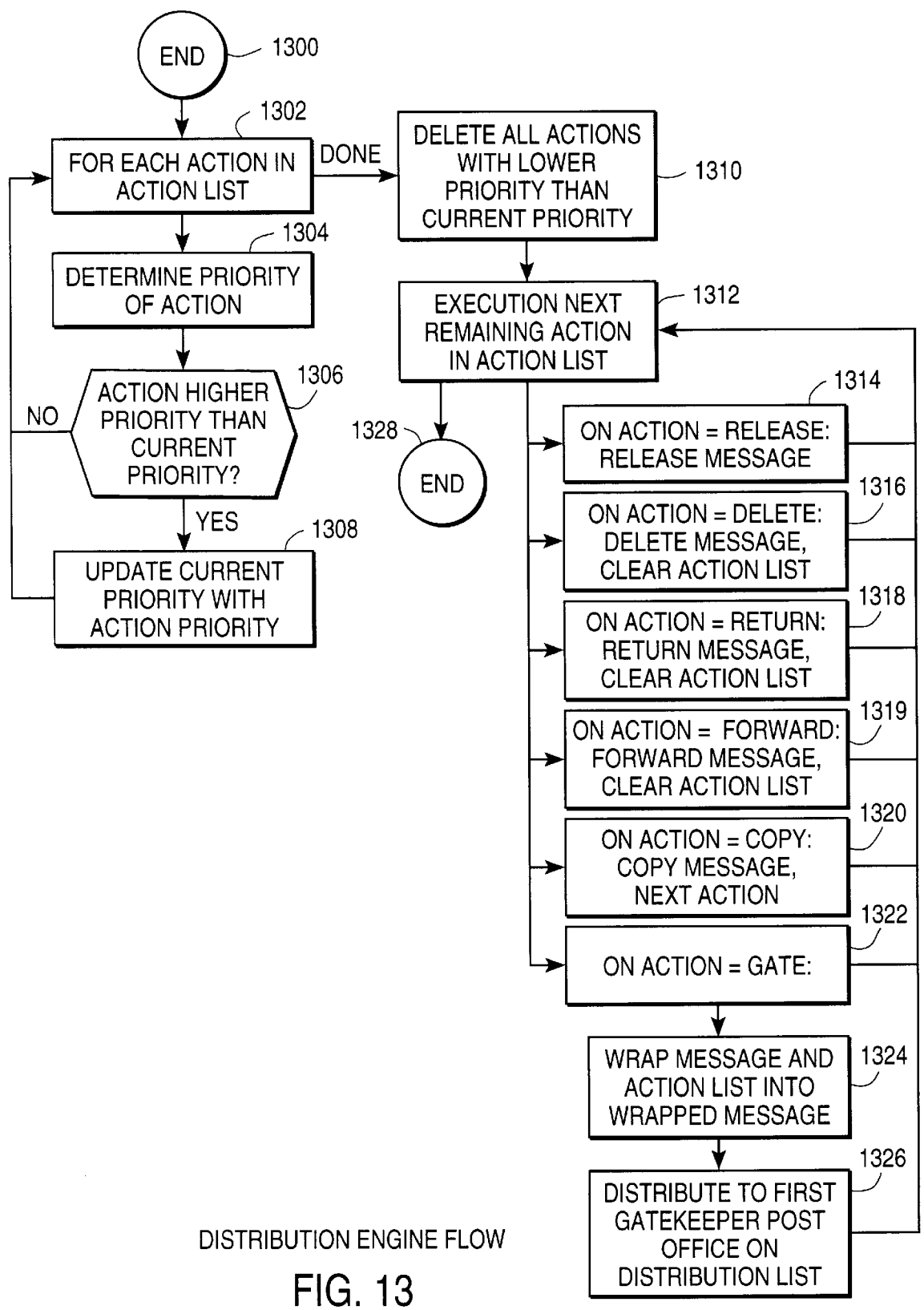
FIG. 13 is a flow diagram of the operation of the distribution engine for handling e-mail messages based on the action list for each message.

Once the evaluator 1102 completes evaluation of a message with respect to the rule base 270, and invokes the distribution engine 230, the distribution engine 230 completes the processing by applying the actions in the action list to the message. Referring now to FIG. 13 there is shown a flow diagram of the operation of the distribution engine 230 in processing messages.

The distribution engine 230 receives the action list and message from the rule engine 210. For each action in the action list (1302) the distribution engine 230 determines 1304 the priority of the action Priority information is held in a separate priority object; each action has a default priority level which may be adjusted by the administrator. The default priority levels (highest to lowest) for actions are ordered follows: Gate, Return, Forward, Copy, Delete, Release. The distribution engine 230 calls the priority object, passing the action from the action list, and obtains the priority level for the action.

The distribution engine 230 also maintains data for the current priority level, which is initially set to 0. The distribution engine 230 compares 1306 the current priority level with the action's priority level. If the action priority is higher than the current priority, the distribution engine 230 updates 1308 the current priority with the action priority, and continues with the next action. If the current priority is higher, then the distribution engine 230 simply continues.

This process identifies the highest priority action or actions to be executed. Lower priority actions will not be executed. For example, if the highest priority action is to delete the message, then the lower priority release action will not be executed. Similarly, if the highest priority action is to gate the message, then there is no reason to copy the message. Accordingly, the distribution engine 230 deletes 1310 all actions with lower priority than the current priority level.

The distribution engine 230 then executes 1312 the remaining actions in the action list, in order.

If the action is "release," the distribution engine 230 releases 1314 the message, sending it to the next distribution point for delivery to its specified recipients. It is still possible that the message will not be delivered to such recipients because it may be gated by another REPO 102 or GPO 106 within the system. The distribution engine 230 then continue 1312 with the next action in the action list.

If the action is "delete", the distribution engine 230 deletes 1316 the message, clears the action list and continues.

If the action is "return", the distribution engine 230 returns 1318 the message to its sender, clears the action list, and continues.

If the action is "forward", the distribution engine 230 forwards 1319 the message to recipients specified in the action for the applicable rule, clears the action list, and continues.

If the action is "copy", the distribution engine 230 copies 1320 the message, and then releases the message for distribution.

Figure 14:
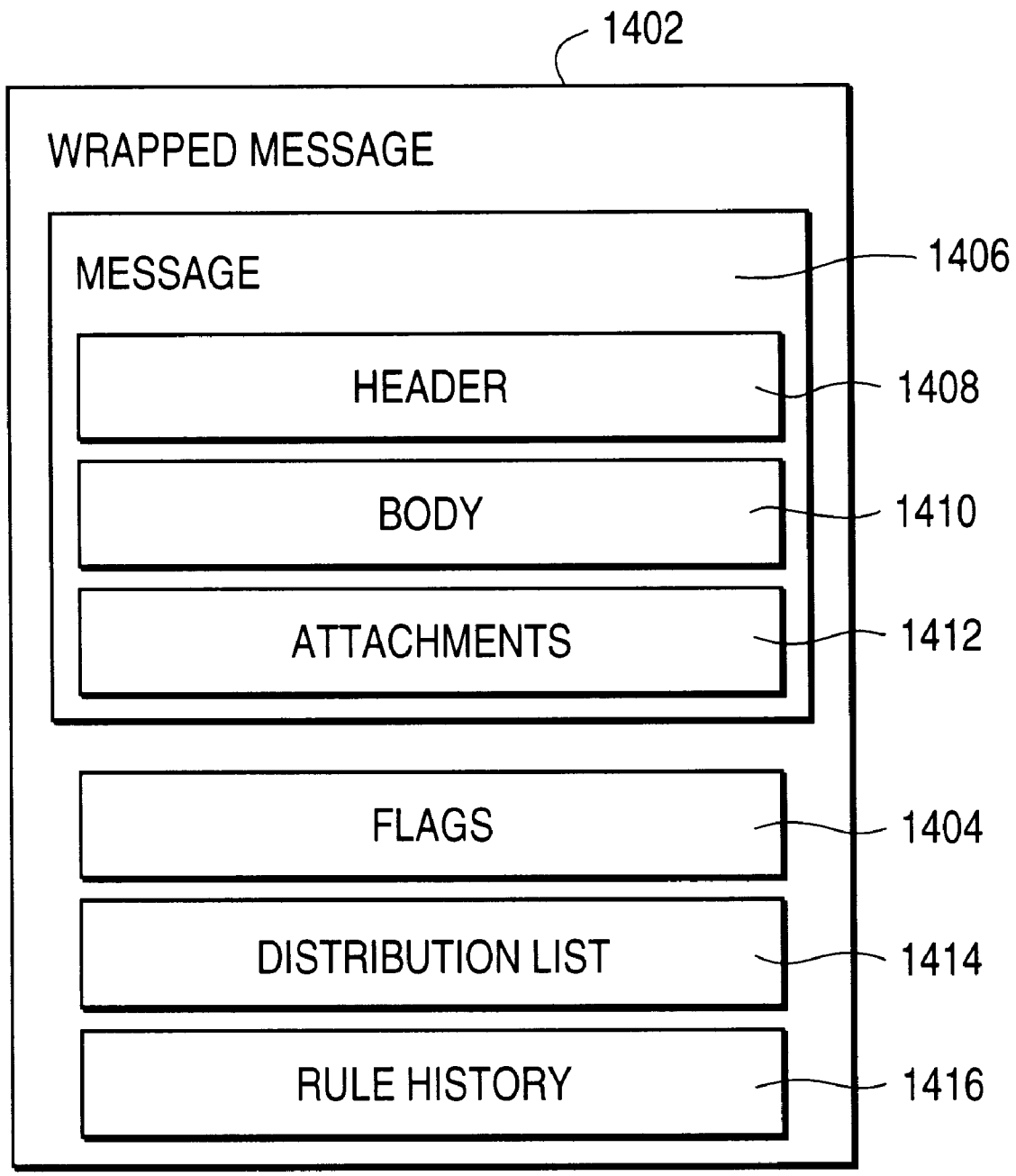
FIG. 14 is an illustration of the structure of a wrapped message.

Finally, if the action is "gate", the distribution engine 230 first wraps 1324 the message object and the action list into a wrapped message. A wrapped message is a special type of message within the system. FIG. 14 illustrates the structure of a wrapped message 1402. The wrapped message 1402 contains a distribution list 1414 of all the GPOs 106 that are to review the message based on the rules that fired. This distribution information is encoded in the action list, since each gate action includes the address of the gatekeeper and GPO 106 that is to receive the gated message. The last addressee on this distribution list 1414 is the REPO 102 (or GPO 106) that is sending the message for gating. The distribution engine 230 extracts this distribution information from the action list and stores it in the distribution list 1414. The usefulness of placing the REPO 102 last on the distribution list 1414 is explained further below.

The wrapped message 1402 also contains a rule history 1416 of the reasons why the message was removed from the normal distribution stream. Each rule is identified by a rule ID and a timestamp indicating when the rule was fired. This information is used by the GKI 107 to inform the gatekeeper of the reasons the message was gated.

The wrapped message 1402 contains flags 1404 indicating the status of the message. The wrapped message contains a flag that indicates that the message should be delivered unabated from this point forward to the designated GPO 106. This allows the message to be immediately delivered to the GPO 106 without further processing.

Finally, the wrapped message 1402 includes the original message data 1406, including its header 1408, body 1410, and any attachments 1412.

The flags 1404, distribution list 1414 and rule history 1416 are preferably encoded after the message data 1406; in this manner these portions of the wrapped message are ignored by conventional post offices, which deliver the message in a conventional fashion. Only a REPO 102 or GPO 106 programmed in accordance with the present invention processes this wrapper information.

Accordingly, after constructing the wrapped message 1402, the distribution engine 230 distributes 1326 it to the first GPO 106 on the distribution list 1414.

As noted above, the REPO 102 may itself receive messages from other REPOs 102. If these messages are wrapped messages, then they have already been gated and need not be reviewed by the rule engine 210 of the recipient REPO 102. The flag information in the wrapped messages indicates this status to the receipt engine 200. The receipt engine 200 provides the wrapped message directly to the distribution engine 230, which exports an interface for directly releasing a message.

VII. Gatekeeping at a Gatekeeping Post Office

Configuring the GPO

Figure 15:
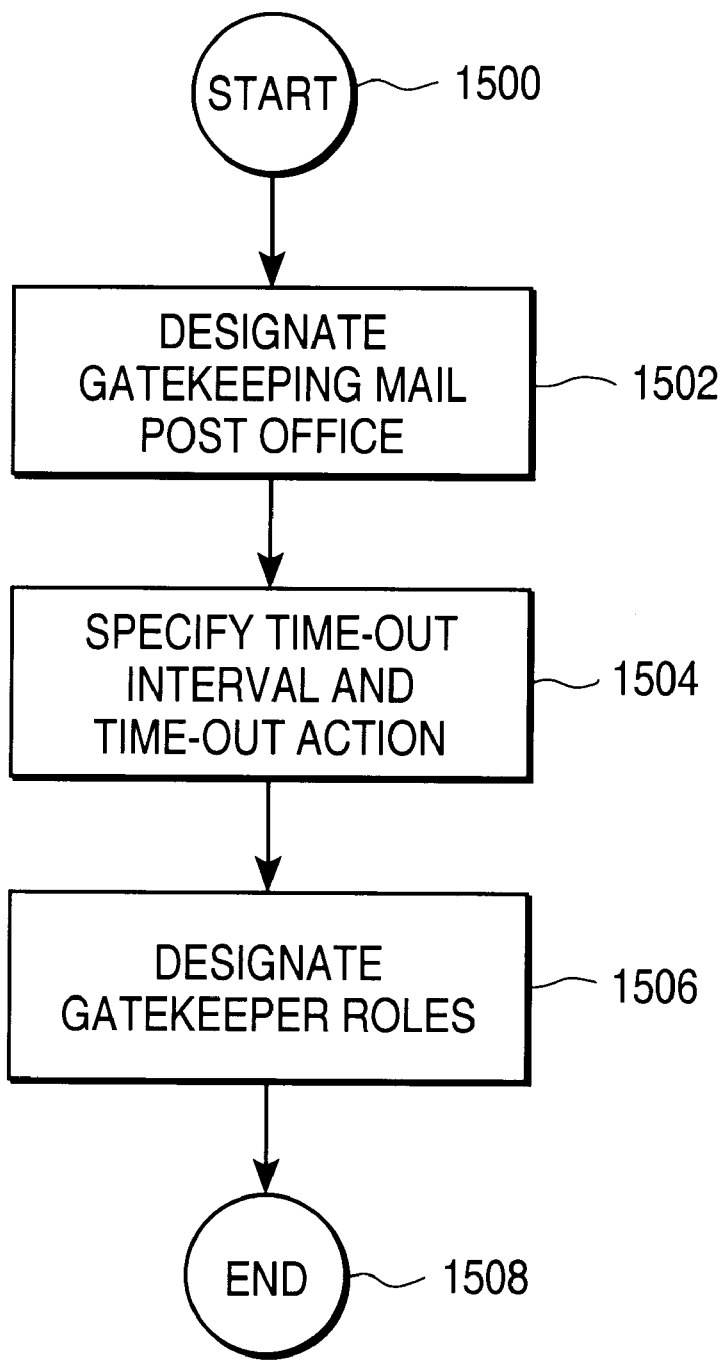
FIG. 15 is a flow diagram of a process for configuring a gatekeeping post office.

Referring now to FIG. 15 there is shown a flow chart of the process of configuring a GPO 106. In one embodiment, a GPO 106 is configured with the GKADMIN 108, instead of from within the executable of the GPO 106 itself. This lets an administrator easily configure any number of GPOs 106 on the network, without having to load and execute each one individually, which may not always be possible, since some GPOs 106 will execute on remote computers from the one being used by the administrator.

Figure 16:
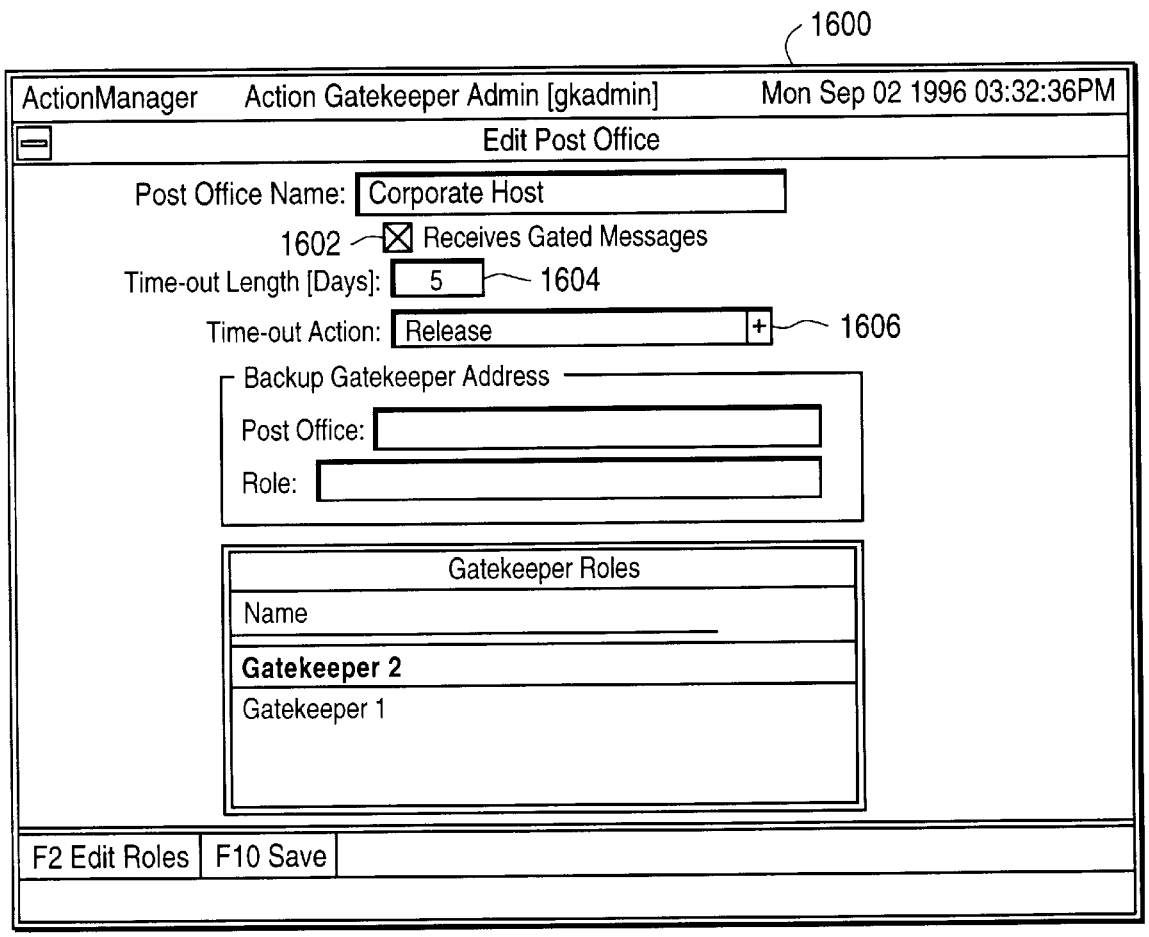
FIG. 16 is an illustration of a user interface for configuring a gatekeeping post office.

Configuration generally begins with designating 1502 a post office as a GPO 106. Any REPO 102 may be designated as a GPO 106, and operate accordingly. This results in enabling the extended functionality of the GPO 106. For the purposes of this disclosure, the REPO 102 becomes a GPO 106 when so configured. The approach provides considerable flexibility to the administrator in configuring the mail system, depending on the performance, server loads, and other considerations. FIG. 16 illustrates a user interface 1600 from the GKADMIN 108 for designating a post office as a GPO 106. The administrator checks the "Receives Gated Messages" box 1602 to designate a REPO 102 as being a GPO 106. In addition, at any time a GPO 106 may be changed back to a REPO 102, so that it no longer provides gatekeeping functionality.

The administrator then specifies 1504 an interval time parameter and an optional time out action: for example, as illustrated in FIG. 16, fields 1604 and 1606 respectively, are the parameters associated with the gatekeeper's inbox in the GPO 106. The interval time parameter is the number of minutes, hours, days, or other interval of time for which gated messages are left in the inbox to allow the gatekeeper to manually review the messages. This time value is added to the timestamp of each gated message as it is received at the GPO 106 to produce an expiration date for the message. As described above, the expiration date is then used by the GPO 106 to automatically initiate a further action to be applied to the message. The optional time out action may be used to specify the action to be applied to all expired messages, rather than individual actions as would be applied from the business rules in the gatekeeping rule base 289.

Figure 17:
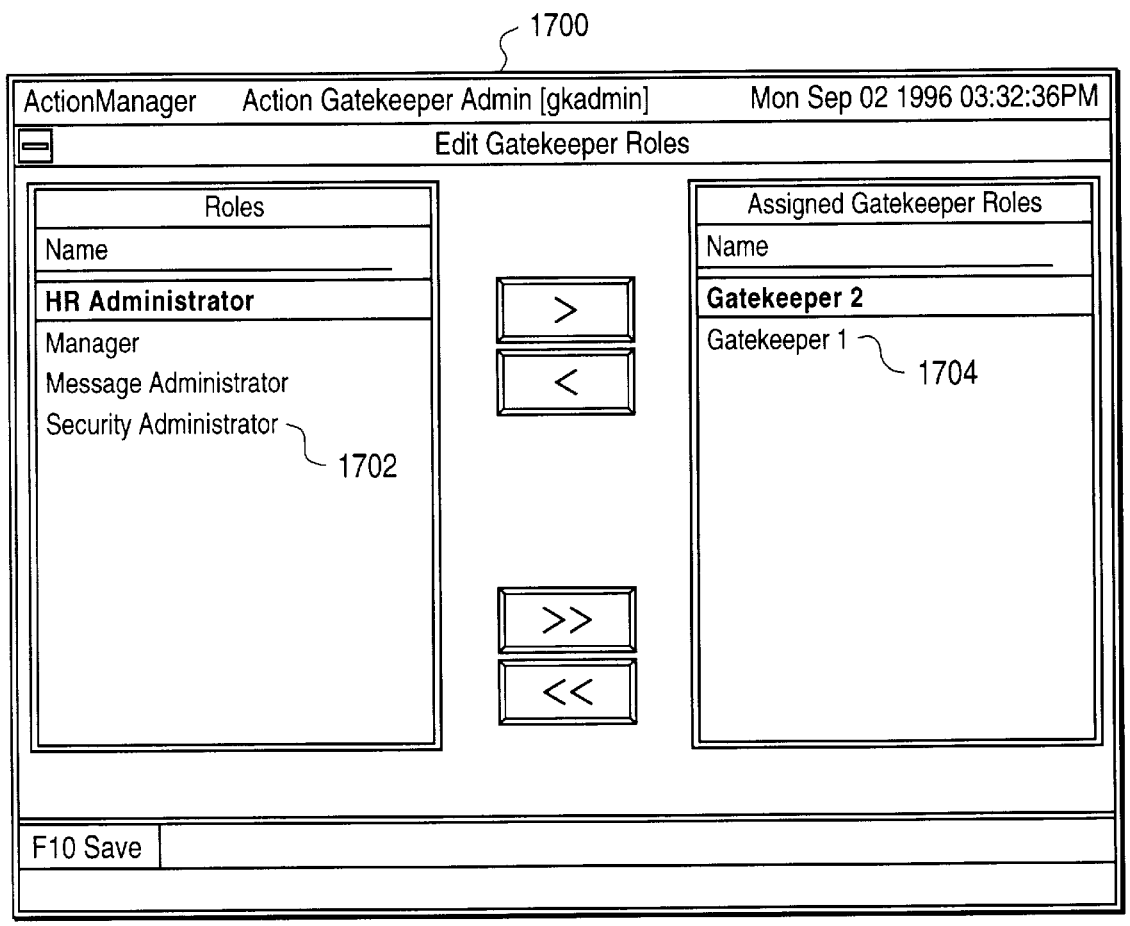
FIG. 17 is an illustration of user interface for assigning organizational roles to gatekeeper roles.

The administrator also designates 1506 gatekeeper roles. These roles are used to determine which members of the organization will have access to gated messages for further evaluation and disposition. FIG. 17 illustrates a sample user interface 1700 of the GKADMIN 108 for designating gatekeeper roles. An organizational role 1702 is selected, and associated with a gatekeeper role 1704. The roles used for assignment are stored in the organizational database 111. The GKADMIN 108 creates a separate table of gatekeeper roles and stores this with the GPO 106 being configured.

Receiving Messages

Figure 18:
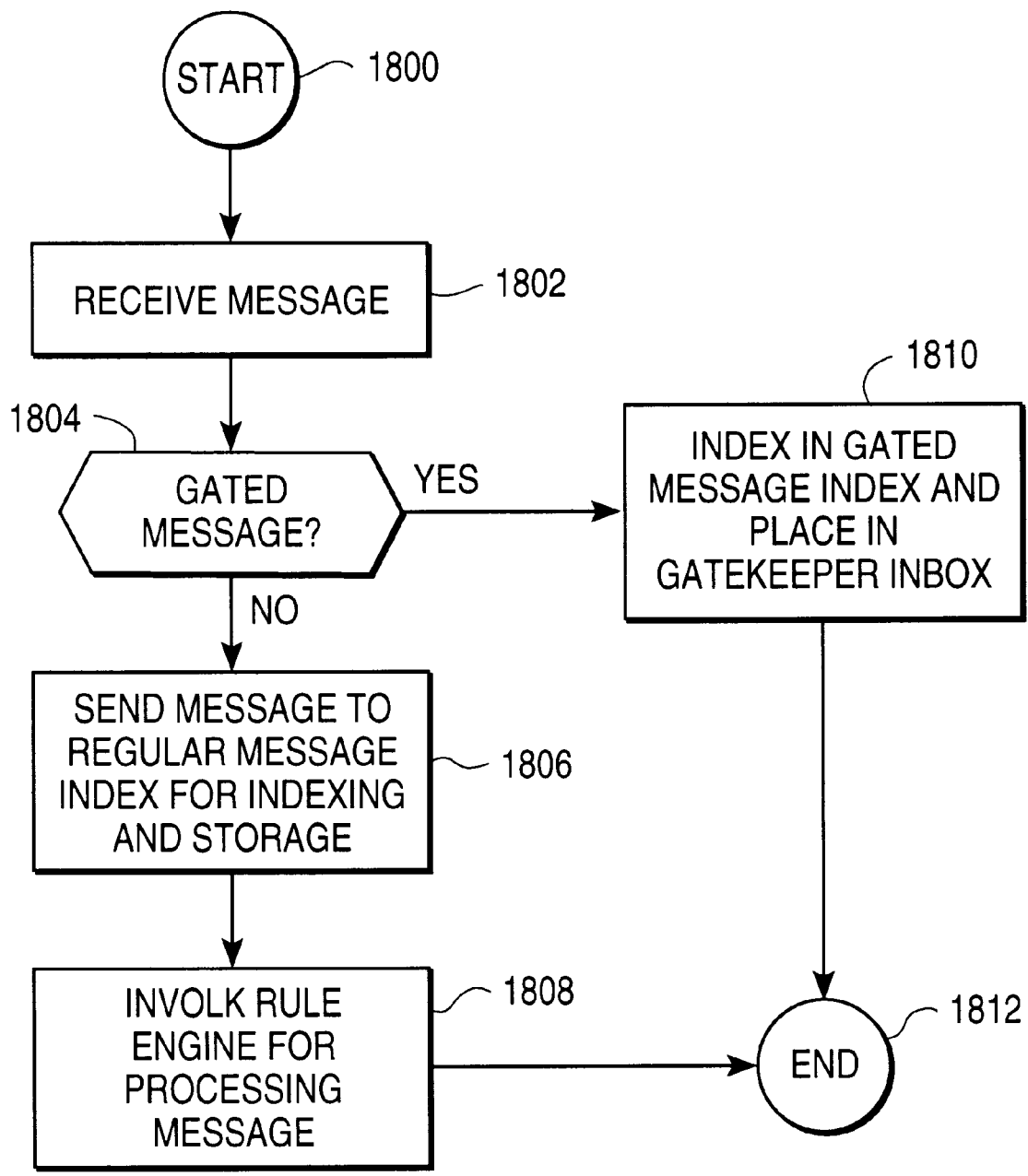
FIG. 18 is an illustration of the operation of the receipt engine of a gatekeeping post office.

FIG. 18 illustrates the operation of the receipt engine 282 for receiving messages, when a GPO 106 also includes rule processing functionality for handling non-gated messages. The gatekeeping rule engine 283 operates to receive 1802 both conventional and gated (wrapped) messages from either conventional post offices, other GPOs 106, or REPOs 102, and processes these messages accordingly for handling by a gatekeeper (gated messages) or the distribution engine 284 (non-gated messages). The low level operation of the receipt engine 282 for setting up and receiving a message is essentially the same as described above. The receipt engine 282 differs in that it performs additional processing on a gated message.

The receipt engine 282 determines 1804 if the message is a gated message by whether it contains the additional wrapper information of the distribution list, flags, and rule history information. If the message is a gated message, then the receipt engine 282 provides 1810 the gated message to the inbox of the gatekeeper to whom the message is addressed. This gatekeeper can then review the gated message at a later point in time. The receipt engine 282 updates the gatekeeping message index 287, including storing in the gatekeeping message index 287 the expiration date for the message, based on the timestamp of the message and upon the interval time parameter of that particular gatekeeper's inbox.

If the message is not gated and hence not wrapped, then the receipt engine 282 sends 1806 the message to the regular message index 240 for indexing and storage, and then invokes 1808 the rule engine 210 to process the message in the same manner as described above, using the rule base 270. In this manner, wrapped (gated) messages are specifically diverted from further rule processing at this stage, but rather, stored in the inbox of the gatekeeper until such time as they are manually or automatically reviewed.

Manual Review of Gated Messages

Each GPO 106 provides for manual review of messages by one or more persons having been designated the role of gatekeepers. At each GPO 106 there may be any number of assigned gatekeeper administrators (individuals responsible for reviewing gated messages). When a REPO 102 sends a gated message, the rule that fires indicates which gatekeeper is to review the message. The distribution engine 230 of the REPO 102 sends the message to the GPO 106 associated with the designated gatekeeper. As noted above, such a gated message is placed in the inbox of the gatekeeper for review.

In one embodiment, the gatekeeper accesses gated messages through a separate utility program, the GKI 107, operates like a mail client, but includes additional functionality. Access through a separate utility program is desirable because the gatekeeper can thereby access any number of GPOs 106 for performing manual review of gated messages, instead of having to execute built-in functionality of each GPO 106.

When the gatekeeper accesses a message in the inbox, the GKI 107 automatically unwraps the message and provides the wrapper information to the gatekeeper. This wrapper information tells the gatekeeper the rule history indicating which rules fired and hence the reason the message was gated, and the particular routing history for the message.

FIG. 19 illustrates a sample user interface of the GKI 107, the main gatekeeper screen 1901. When a gatekeeper logs into a GPO 106, she identifies which gatekeeper role she has; the GKI 107 then displays in the gatekeeper screen 1901 the messages 1916 that have been gated to that gatekeeper. For each message, there is shown the sender, location, and the subject line of the message. In addition, a status value 1903 informs the gatekeeper whether the message has only been gated, or reviewed. The reason 1905 that the message has been gate is also shown, extracted from the rule history information in the wrapper of the message.

The main gatekeeper screen 1901 also displays a list of the mailbag folders that have been defined by the gatekeeper.

From the GKI 107, the gatekeeper can release 1909, return 1911, forward 1913, or file 1915 any message, by selection of the appropriate button.

Figure 20:
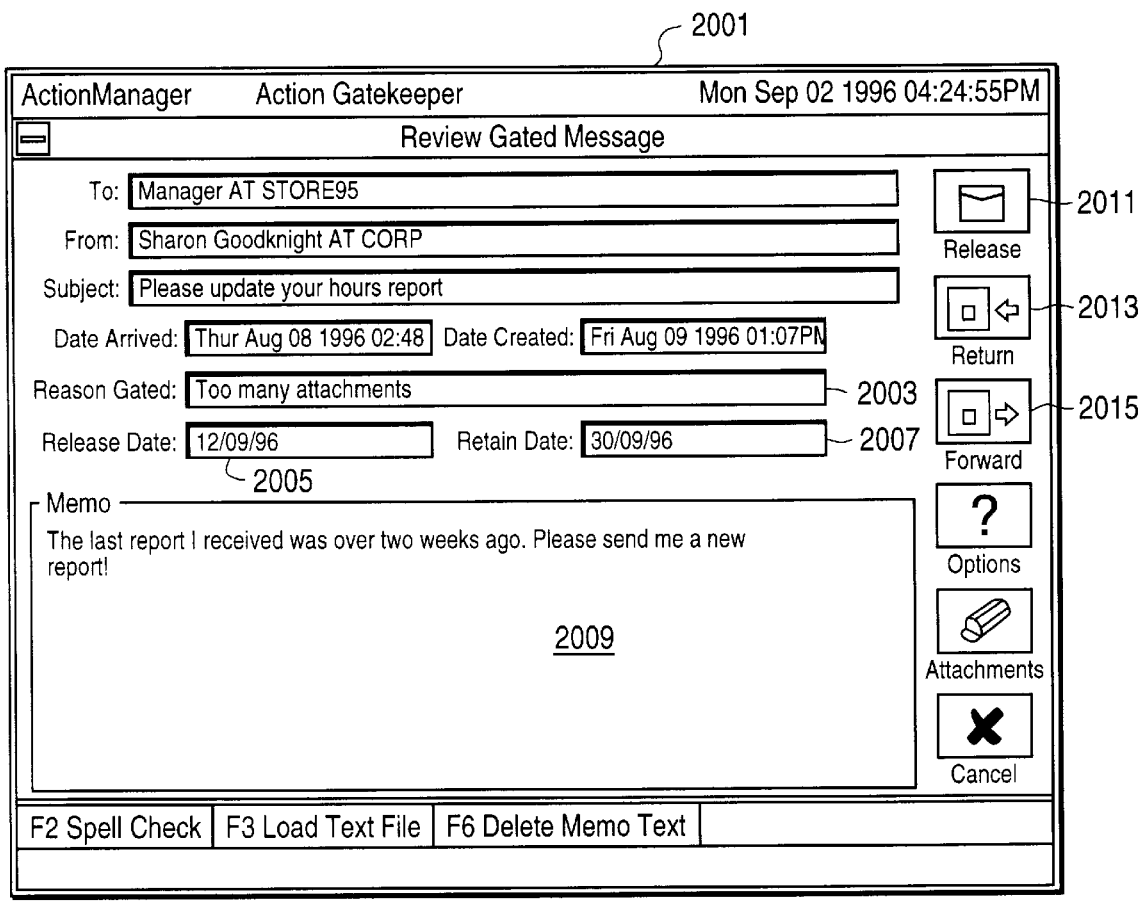
FIG. 20 is an illustration of a user interface for reviewing a gated message.

The GKI 107 also provides the gatekeeper the ability to read and edit individual messages. To review a message, the gatekeeper selects the message and clicks on the review button 1907. FIG. 20 illustrates a sample screen for reviewing messages. This screen 2001 includes specific fields identifying the sender, specified recipients, subject line, creation and arrival dates. In addition, there is shown the reason 2003 the message was gated, the release date 2005 of the message (which is its expiration date as determined when the message was placed in the inbox), and its retain date 2007, if any. The retain date 2007 is the date after which the GPO 106 will delete the message from the inbox. These dates may be manually changed by the gatekeeper. The gatekeeper can edit the text of the message in the text field 2009, for example to remove offensive language, or confidential information.

The gatekeeper can immediately release 2011, return 2013, or forward 2015 a gated message. Forwarding a gated message enables the gatekeeper to send the message to another gatekeeper for additional review, as described above with respect to FIG. 4B; an additional screen is displayed (not shown) into which the gatekeeper can add instructions or information for the next gatekeeper. Forwarding a gated message also enables the gatekeeper to send the message to recipient(s) other than the specified recipient(s) for further processing and disposition.

Figure 21:
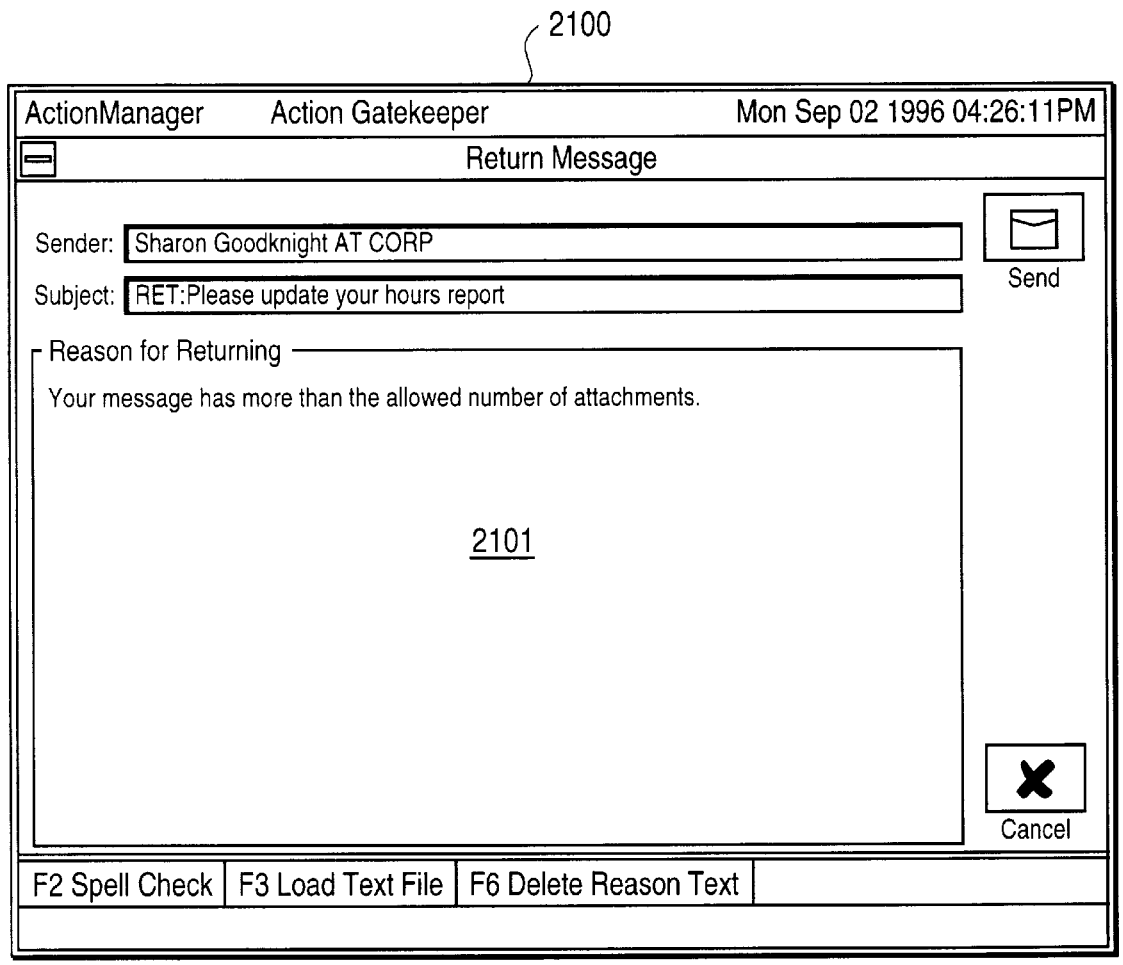
FIG. 21 is an illustration of a user interface for returning a gated message to its sender.

FIG. 21 illustrates a screen 2100 used by a gatekeeper when returning a 8 message to the sender. When returning a message, the gatekeeper can also include in text field 2101 an explanation to the sender of why the message was not delivered. The gatekeeper may also move a message to a mailbag folder.

In one embodiment, when the gatekeeper moves a message from the inbox to one of the mailbags, the expiration date of the message is updated according to the time parameter of the selected mailbag. In this manner, all messages associated with a specific mailbag have the same expiration date. For example, a gatekeeper's inbox may have a interval time parameter of 10 days, the gatekeeper has set the time parameter for a delete mailbag at 30 days, and the last date the mailbag contents were deleted was Jan. 5, 1997. Assume that a message is received with a timestamp of Jan. 1, 1998. When the message is indexed and placed in the inbox of the gatekeeper, the gatekeeping message index 287 is updated with an expiration date for the message of Jan. 11, 1998. Now, assume that on Jan. 6, 1998 the gatekeeper manually reviews the message and decides to move it to the delete mailbag. The expiration date of the message is automatically reset to Feb. 5, 1998, or 30 days after the last delete. This date will be the expiration date for all messages moved to this mailbag, up until Feb. 6, 1998, when the expiration date will be advanced to Mar. 5, 1998.

Automated Review of Gated Messages

Automated review of gated messages is applied to those messages in the inbox of each gatekeeper which have not been manually reviewed prior to their individual expiration dates. The automated review of messages is provided by additional functionality of the GPO 106, such as part of the program executive. Automated review applies the rules defined by the gatekeeper in the gatekeeping rule base 289 to each expired message in the inbox. Each gatekeeper can write their own rules in the gatekeeping rule base 289 for handling these gated messages, and can apply more detailed analysis and handling of gated messages. Each gatekeeper defines rules for the gatekeeping rule base 289 in the same manner as described above for the rule base 270.

While the functional operation of the rule engine 283 is the same as with the rule engine 210 of a REPO 102, because the rules written by a gatekeeper may be different from the rules at a REPO 102, a given message may be handled in a different manner. Whereas the checkpoints of the REPO 102 are intended to operate on messages that are being rule processed for the first time, the rules of the gatekeeping rule base 289 are used to apply additional, and if necessary, more detailed review of the gated messages. More particularly, these rules can process the messages on the rule history information itself, in addition to all of the other properties and attributes used in the REPOs. This allows for very detailed rules to be applied to gated messages.

For example, if a REPO 102 gates messages greater than 1 Mb, then the gatekeeping rule base 289 rules can check the role of the sender and release the message for certain senders only, deleting the messages from all other senders.

The rule structure is applicable as before, with rules having both antecedent and consequent components. The rule actions include the gate, delete, release, and return actions described above.

In addition, a review action, and mailbag actions are provided for rules at the gatekeeping rule base 289. A review action specifies that the message is to be manually reviewed by a gatekeeper. During such review the gatekeeper administrator can edit the message. When a rule with a review action is fired, then the rule engine 283 moves the message to a review mailbag by updating the folder association for the message in the gatekeeping message index 287. This review action is useful because it helps the gatekeeper identify messages which need to be specifically reviewed, and which the gatekeeper did not previously consider or attempt to review (since the message was automatically reviewed due to it expiring).

Whereas the actions applied by the rules at the REPO 102 are effectively applied immediately, the actions available at the GPO 106 include actions for moving the message into one of the mailbags for delayed, periodic execution of the action for the mailbag. A mailbag action takes as an argument the name of one of the mailbags in the master folder table 290. The message is then associated with the specified mailbag in the gatekeeping message index 287. The message will be acted upon according to the appropriate action for the mailbag when the time parameters of the specified mailbag are satisfied. For example, a rule may move a message into a mailbag with a retain date set for the end of the current month, at which time the message is deleted with other messages in the folder.

Figure 22:
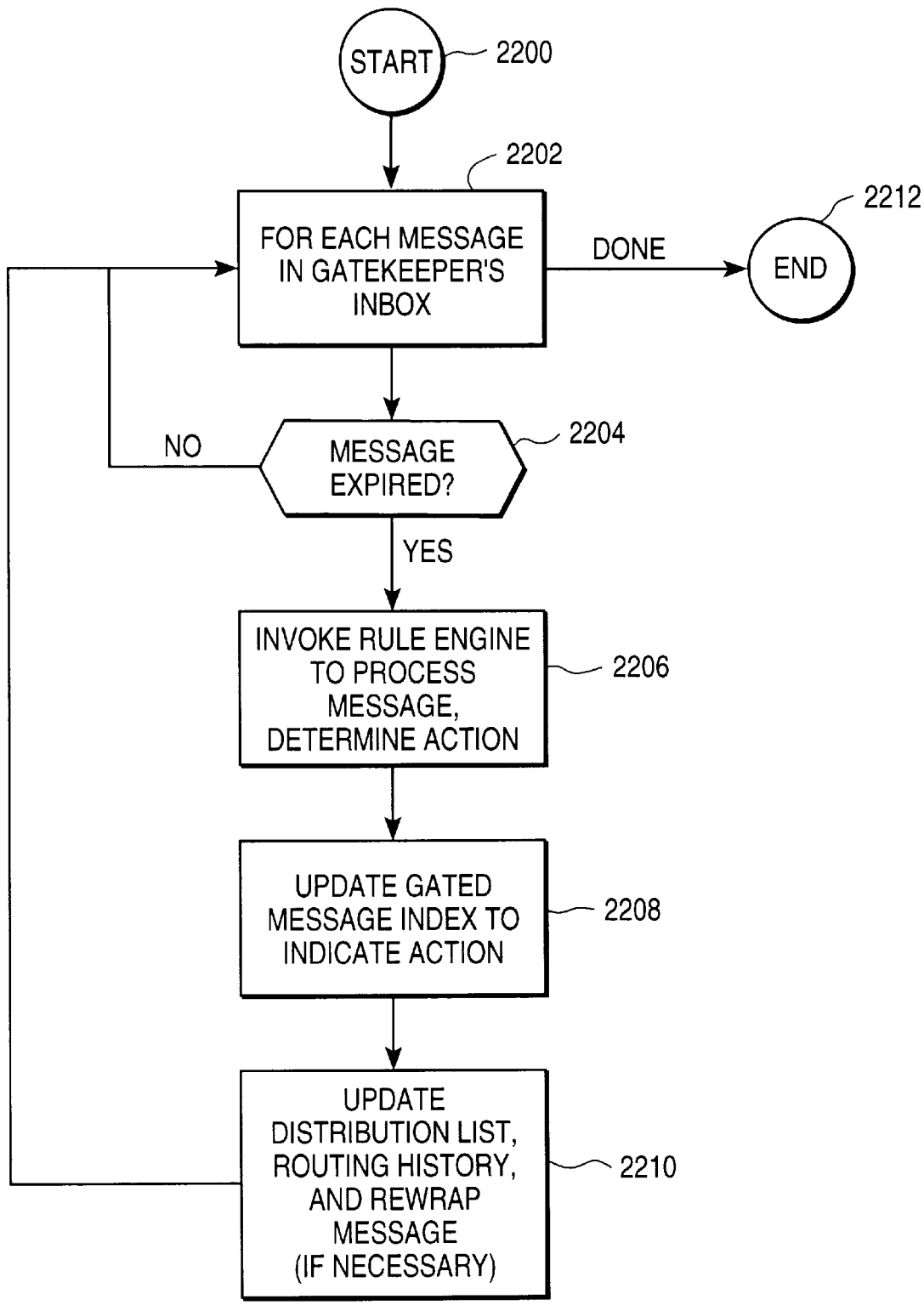
FIG. 22 is a flow diagram of the operation of the gatekeeping post office during automatic message processing.

Referring now to FIG. 22 there is shown a flow graph of the operation of the GPO in providing automatic review of messages. The GPO 106 periodically awakens the distribution engine 284 as a daemon process to process messages that have indexed in the inbox of each gatekeeper. For each message in the inbox (2202), the distribution engine 284 determines 2204 whether the message is expired, that is whether the current date is equal to, or greater than the expiration date. If the message is not expired, the distribution engine 284 continues with the next message in the inbox.

If the message is expired, then the distribution engine 284 invokes 2206 the rule engine 283 to apply the rules from the gatekeeping rule base 289 to the message. These rules are applied by the rule engine 283 as described above until one of the rules fires, or all rules are applied. As described above, the rule engine 283 returns an action list to the distribution engine 284 for the message. This action list identifies the action to be taken upon the message. Generally, the distribution engine 284 updates 2208 the gatekeeping message index 287 to indicate the specific action taken for the message. The distribution engine 284 then updates 2210 the distribution list, routing history, and rewraps the message, if necessary (some actions, such as delete, do not need the message to be rewrapped). The distribution engine 284 then continues with the next message. More specifically then, the distribution engine 284 handles the actions as follows:

On a return action, the distribution engine 284 updates the gatekeeping message index 287 to indicate that the message is being returned. The distribution engine 284 rewraps the message with updated history information, to indicate both that the message has been handled by this gatekeeper (storing the gatekeeper id in the wrapper) and to indicate the action taken. The distribution engine 284 continues with the next message.

On a delete action, the distribution engine 284 updates the gatekeeping message index 287 to indicate that the message is being deleted. There is no need to rewrap the message. The message is then deleted. The distribution engine 284 continues with the next message.

On a forward action, the distribution engine 284 updates the gatekeeping message index 287 to indicate that the message is released. The message is rewrapped with the gatekeeper ID and action taken (here forward and the reasons). The distribution list is updated to place the GPO 106 of the new recipient as the next GPO 106 on the list; the current GPO 106 is added at the end of the distribution list. The new recipient may be another gatekeeper, or it may be any other recipient to whom it is useful to send the message for further processing and response. The distribution engine 284 then sends the message to the next GPO on the distribution list. The distribution engine 284 continues with the next message.

On a release action, the distribution engine 284 updates the gatekeeping message index 287 to indicate that the message is released. The distribution engine 284 rewraps the message with the updated routing history so that the current gatekeeper, which is the first one on the routing history list, becomes a past gatekeeper. The next gatekeeper on the routing list is copied to the recipient list for the message. This enables the message to be routed to another gatekeeper, if there is one. This will happen when the original REPO that gated the message indicated that more then one gatekeeper was to review the message. In this case, after the present gatekeeper is done, the recipient list is updated so that the next gatekeeper may receive the message for review.

On a review action, the distribution engine 284 updates the gatekeeping message index 287 to place the message in the review mailbag for subsequent review by the gatekeeper.

As noted, an action for a message may be a mailbag action, which is to move the message to a particular mailbag. Here, the distribution engine 284 updates the gatekeeping message index 287 with an ID of the mailbag (as taken from the action). The distribution engine 284 checks whether the time parameter for the designated mailbag has expired. If so then, the distribution engine 284 performs the function associated with the mailbag, whether to release, delete, forward or so forth, the messages in the mailbag.

Distributed Gatekeeping

A release action allows a message to continue from the GPO 106 unabated by any further rule processing by another other REPO 102 or GPO 106. Once released, the message is sent to the next GPO 106, if any on the distribution list are included in the wrapper. This allows for continued handling according to the original REPO 102 rules. Each GPO 106 tags the message with its ID indicating that it has reviewed the message.

Once the last GPO 106 processes the message, the last item on the distribution list is the original REPO 102; this data item was placed in the wrapper by the distribution engine 230 of the original REPO 102. Thus, the message is returned to the REPO 102 for further distribution. The next distribution destination may be to another GPO 106 in the network which will apply its own rules. This feature enables very complex rule processing, and fully distributed and independent rule handling by any number of different GPOs 106.

When the original REPO 102 gets the message back, it reprocesses the message and applies its rule from the rule base 270 again. The list of gatekeepers in the wrapper who have reviewed the message is an "innoculant," and is used to prevent the REPO 102 from re-gating the message back to one of these gatekeepers, though the message may be gated to another gatekeeper at the same GPO 106. The REPO 102 compares the list of gatekeepers who have seen the message, with the resulting list of gatekeepers from the new rule firing. If there is a match, then the message is not sent to the matching gatekeeper because that gatekeeper has already reviewed the message once before. In this manner, the message is gated only to gatekeepers who have not yet reviewed the message. Reprocessing the message in this manner is desirable because there may have been changes in the rules of the original REPO 102 during the time period the message was being evaluated at the various GPOs 106, but it is assumed that a gatekeeper who has once reviewed a message need not review it again.

In summary, the present invention, in its various embodiments, provides a system, method, and various software products for controlling the distribution of data objects, including e-mail messages, on a communication network. The present invention applies business rules which can implement corporate communication policies, to such data objects as they are transferred through a post office or similar mail transfer agent. The business rules that are satisfied by the properties and attributes of a data object generate a set of actions to be applied to the data object. These actions are applied to the data object. The data object may be gated such that it is not delivered to its specified recipients, but rather to a gatekeeper who may manually review the message, or may allow it to be further reviewed automatically by yet another set of business rules. In this manner, fully distributed gatekeeping of any and all messages and data objects can be enforced in a networked environment.

We claim:
1. A post office for receiving and redistributing e-mail messages on a computer network, the post office comprising:
   a receipt mechanism that receives an e-mail message from a sender, the e-mail message having at least one specified recipient;
   a database of business rules, each business rule specifying an action for controlling the delivery of an e-mail message as a function of an attribute of the e-mail message;
   a rule engine coupled to receive an e-mail message from the receipt mechanism and coupled to the database to selectively apply the business rules to the e-mail message to determine from selected ones of the business rules a set of actions to be applied to the e-mail message; and
   a distribution mechanism coupled to receive the set of actions from the rule engine and apply at least one action thereof to the e-mail message to control delivery of the e-mail message and which in response to the rule engine applying an action of deferring delivery of the e-mail message, the distribution engine automatically combines the e-mail message with a new distribution list specifying at least one destination post office for receiving the e-mail message for review by an administrator associated with the destination post office, and a rule history specifying the business rules that were determined to be applicable to the e-mail message by at least one rule engine, and automatically delivers the e-mail message to a first destination post office on the distribution list instead of a specified recipient of the e-mail message.

2. The post office of claim 1, wherein the actions are selected from a group comprising:
   deleting an e-mail message instead of delivering the e-mail message to a specified recipient;
   delivering the e-mail message to a recipient other than a specified recipient;
   returning the e-mail message to the sender; and,
   deferring delivery of the e-mail message to a later time.

3. The post office of claim 1, wherein, each business rule includes at least one antecedent, each antecedent defining an attribute, an operator, and value, wherein the attributes are selected from a group including:
   a number of attachments;
   a size of attachments; and
   a text of the message.

4. The post office of claim 1, wherein, each business rule includes at least one antecedent, each antecedent defining an attribute, an operator, and value, wherein the attribute is determined by statistical performance data of the post office.

5. A post office for receiving and redistributing e-mail messages on a computer network, the post office comprising:
   a data base storing an organizational hierarchy of the business, the hierarchy including a plurality of roles, each role associated with a user;
   a receipt mechanism that receives an e-mail message from a sender, each e-mail message having at least one user specified as a recipient;
   a database of business rules, each business rule specifying an action for controlling the delivery of an e-mail message as a function of an attribute of the e-mail message, wherein at least one business rule defines an action for prohibiting or deferring delivery of an e-mail message based upon a role of a recipient user in the organizational hierarchy;
   a rule engine coupled to receive an e-mail message from the receipt mechanism and to the data base to selectively apply the business rules to the e-mail message to determine from selected ones of the business rules a set of actions to be applied to the e-mail message; and
   a distribution mechanism coupled to receive the set of actions from the rule engine and apply at least one action thereof to the e-mail message to control delivery of the e-mail message.

6. The post office of claim 1, further comprising:
   a primary message store, coupled to the receipt engine, for receiving and non-persistently storing e-mail messages; and
   a secondary message store, accessible to the distribution engine, for receiving therefrom, and persistently storing an e-mail message in response to the rule engine determining that the e-mail message satisfied a business rule requiring the e-mail message to be reviewed by a recipient other than a recipient specified by a sender of the e-mail message.

7. The post office of claim 1, further comprising:
   a primary message store, coupled to the receipt engine, for receiving and non-persistently storing e-mail messages; and
   a secondary message store, coupled to the distribution engine, for receiving therefrom, and persistently storing an e-mail message in response to the rule engine specifying the action that the e-mail message be reviewed by an administrator recipient prior to delivery to a specified recipient.

8. The post office of claim 1, wherein an e-mail message includes at least one specified recipient, and the distribution engine delivers the e-mail message to a non-specified recipient prior to delivery to a specified recipient.

9. The post office of claim 1, wherein:
   the rule engine specifies an action of deleting the e-mail message; and
   the distribution engine automatically deletes the e-mail message, without delivering the e-mail message to any of its specified recipients.

10. The post office of claim 1, wherein:
    the rule engine specifies an action of copying the e-mail message; and
    the distribution engine automatically copies the e-mail message, and delivers the copy of the e-mail message to a recipient other than a specified recipient.

11. The post office of claim 1, wherein:
    the rule engine specifies an action of returning the e-mail message; and
    the distribution engine automatically returns the e-mail message to a sender, and does not deliver.the e-mail message to any of its specified recipients.

12. The post office of claim 1, wherein:
    the rule engine specifies an action of deferring the e-mail message; and
    the distribution engine persistently stores the e-mail message in a storage area for subsequent review by an administrator, and does not deliver the e-mail message to any of the specified recipients.

13. The post office of claim 1, wherein each action has a priority, and the distribution engine executes a highest priority action for each e-mail message.

14. The post office of claim 13, wherein a highest priority is assigned to an action of gating an e-mail message to a recipient other than a specified recipient.

15. An e-mail system comprising:
a first post office operating on a first computer;
a second post office, operating on a second computer, the second post office comprising:
   a receipt mechanism for receiving e-mail messages from a plurality of clients, each e-mail message having at least one specified recipient;
   a database of business rules, each business rule specifying an action for controlling delivery of an e-mail message;
   a rule engine coupled to receive an e-mail message from the receipt mechanism and selectively applying the business rules to the e-mail message to determine a set of actions to be applied to the e-mail message to control delivery of the e-mail message, the rule engine specifying for at least one e-mail message an action of deferring delivery of the message to its specified recipients by delivering the message to an administrator associated with the first post office;
   a distribution mechanism coupled to receive the at least one action from the rule engine and which in response to the rule engine applying the action of deferring delivery of the e-mail message, the distribution mechanism automatically combines the e-mail message with a new distribution list specifying at least the first post office for receiving the e-mail message for review by the administrator associated with the first post office, and a rule history specifying at least one business rule determined to be applicable to the e-mail message by at least one rule engine, and automatically delivers the e-mail message to the first post office on the distribution list instead of a specified recipient of the e-mail message.

16. The e-mail system of claim 15, further comprising:
an administration application, communicatively coupled to the first post office, for reviewing e-mail messages delivered to the administrator.

17. A process for controlling the delivery of e-mail message in a business, comprising:
providing to a post office a set of business rules derived from business communication policies, each business rule defining an action applied to an e-mail message based on the attribute of the message;
receiving messages at the post office;
to at least one message received at the post office, applying the business rules to the attributes of the message to determine at least one action of deferring delivery to be applied to the message;
automatically combining the e-mail message with a new distribution list specifying at least one destination post office for receiving the e-mail message for review by an administrator associated with the destination post office and a rule history specifying at least one business rule determined to be applicable to the e-mail message; and
automatically delivering the e-mail message to a destination post office on the distribution list instead of a specified recipient of the e-mail message.

18. A computer implemented process for deferring the delivery of an e-mail message, comprising:
storing a database including an organizational hierarcy of a business, the hierarchy including a plurality of roles, each role associated with a user;
storing a database of business rules, each business rule specifying an action for controlling the delivery of an e-mail message as a function of an attribute of the e-mail message, wherein at least one business rule defines an action for deferring delivery of an e-mail message based upon a role of a recipient user in the organizational hierarchy;
receiving the e-mail message at a post office, the e-mail having at least one specified recipient, the at least one specified recipient having a role; and
applying the business rules to the e-mail message, including responsive to the role of the at least one specified recipient deferring the e-mail message by delivering the e-mail message to an administrator to review the e-mail message prior to any delivery of the e-mail message to the at least one specified recipient.

19. The process of claim 18, further comprising:
receiving a command from the administrator specifying an action to be applied to the e-mail message, the command selected from one of a group consisting of:
   deleting the e-mail message instead of delivering it to its specified recipients;
   copying the e-mail message and delivering the copy to a non-specified recipient; and
   returning the e-mail message to its sender without delivering it to its specified recipients.

20. A computer implemented process for deferring the delivery of an e-mail message, comprising:
storing a database of business rules, each business rule specifying an action for controlling the delivery of an e-mail message as a function of an attribute of the e-mail message;
receiving the e-mail message at a post office, the e-mail message having at least one specified recipient;
deferring delivery of the e-mail message, by:
   automatically combining the e-mail message with a new distribution list specifying at least one new destination post office for receiving the e-mail message for review by an administrator associated with the destination post office and a rule history specifying at least one business rule determined to be applicable to the e-mail message; and
   automatically delivering the e-mail message to a first destination post office on the distribution list instead of a specified recipient of the e-mail message;
persistently storing the e-mail message at the first destination post office until the e-mail message is reviewed;
automatically reviewing the e-mail message after a specified time interval to determine an action to be applied to the e-mail message; and
automatically applying the action to the e-mail message.

21. A process for deferring the delivery of selected e-mail messages, comprising:
storing a database of business rules, each business rule specifying an action for controlling the delivery of an e-mail message as a function of an attribute of the e-mail message;
receiving a plurality of e-mail messages at a first post office, each e-mail message having at least one specified recipient;
selecting at least one e-mail message from the plurality of e-mail messages by applying at least one business rule to the e-mail message;
delivering each non-selected e-mail message to its specified recipients; and
deferring the selected e-mail message by:
   automatically combining the selected e-mail message with a new distribution list specifying at least one new destination post office for receiving the e-mail message for review by an administrator associated with the destination post office and a rule history specifying at least one business rule determined to be applicable to the e-mail message;

automatically delivering the selected e-mail message to a destination post office on the distribution list instead of a specified recipient of the e-mail message;

persistently storing the selected e-mail message in a storage area of the destination post office until the selected e-mail message is reviewed prior to any further delivery of the e-mail message to its specified recipients or to another destination post office on the distribution list.

22. A computer implemented process for reviewing an e-mail message, comprising:

receiving the e-mail message at a first post office, the e-mail message having at least one specified recipient;

deferring the e-mail message by:

automatically combining the selected e-mail message with a new distribution list specifying at least one second post office for receiving the e-mail message for review by an administrator associated with the second post office and a rule history specifying at least one business rule determined to be applicable to the e-mail message; and automatically delivering the selected e-mail message to an administrator at the second post office on the distribution list instead of a specified recipient of the e-mail message;

persistently storing the e-mail message at the second post office until the e-mail message is reviewed;

automatically reviewing the e-mail message after a specified time interval to determine an action to be applied to the e-mail message; and automatically applying the action to the e-mail message.

23. A computer implemented process for reviewing an e-mail message, each e-mail message having at least one specified recipient, the process comprising:

storing a database of business rules, each business rule specifying an action for controlling the delivery of an e-mail message as a function of an attribute of the e-mail message;

automatically combining e-mail message with a distribution list specifying at least one destination post office for receiving the e-mail message for review by an administrator associated with the destination post office, and a rule history specifying at least one business rule determined to be applicable to the e-mail message;

automatically delivering the selected e-mail message to an administrator at a destination post office on the distribution list instead of a specified recipient of the e-mail message;

persistently storing the e-mail message delivered to the administrator in a message store until the e-mail message is reviewed, each e-mail message in the message store having an expiration date;

receiving for at least one of the persistently stored e-mail message, a command from the administrator prior to the expiration date of the e-mail message, the command indicating an action to be applied to the e-mail message, and applying the action to the e-mail message; and for each e-mail message for which a command is not received from the administrator prior to the expiration date of the e-mail message, automatically determining an action to be applied to the message by applying at least one business rule to the e-mail message, and applying the action to the e-mail message.

24. A post office for receiving and redistributing data objects on a computer network, the post office comprising:

a receipt mechanism that receives a data object from a sender, the data object having at least one specified recipient;

a database of business rules, each business rule specifying an action for controlling the delivery of a data object as a function of an attribute of the data object;

a rule engine coupled to receive a data object from the receipt mechanism and coupled to the database to selectively apply the business rules to the data object to determine from selected ones of the business rules a set of actions to be applied to the data object; and a distribution mechanism coupled to receive the set of actions from the rule engine and apply at least one action thereof to the data object to control delivery of the data object and which in response to the rule engine applying an action of deferring delivery of the data object, the distribution engine automatically combines the data object with a new distribution list specifying at least one new destination post office for receiving the data object for review by an administrator associated with the destination post office and a rule history specifying at least one business rule determined to be applicable to the data object by at least one rule engine, and automatically delivers the data object to a first destination post office on the distribution list instead of a specified recipient of the data object.

25. A computer implemented process for deferring the delivery of a data object, comprising:

storing a database including an organizational hierarchy of a business, the hierarchy including a plurality of roles, each role associated with a user;

storing a database of business rules, each business rule specifying an action for controlling the delivery of a data object as a function of an attribute of the data object, wherein at least one business rule defines an action for deferring delivery of a data object based upon a role of a recipient user in the organizational hierarchy;

receiving the data object at a post office, the data object having at least one specified recipient, the at least one specified recipient having a role;

applying the business rules to the data object, including responsive to the role of the recipient deferring delivery of the data object by delivering the data object to a recipient other than a specified recipient;

persistently storing the data object until the data object is reviewed;

automatically reviewing the data object after a specified time interval to determine an action to be applied to the data object; and automatically applying the action to the data object.

26. A process for deferring the delivery of selected data objects, comprising:

storing a database of business rules, each business rule specifying an action for controlling the delivery of a data object as a function of an attribute of the data object;

receiving a plurality of data objects at a first post office, each data object having at least one specified recipient;

selecting at least one data object from the plurality of data objects by applying at least one business rule to the data object;

delivering each non-selected data object to its specified recipients;

deferring the selected data object by:
automatically combining the selected data object with a new distribution list specifying at least one new destination post office for receiving the data object for review by an administrator associated with the destination post office; and a rule history specifying at least one business rule determined to be applicable to the data object;

automatically delivering the selected data object to a destination post office on the distribution list instead of a specified recipient of the data object; and persistently storing the data object in a storage area until the data object is reviewed prior to any further delivery of the data object to its specified recipients.

* * * * *